United States Patent
Handler et al.

(10) Patent No.: US 11,861,746 B2
(45) Date of Patent: *Jan. 2, 2024

(54) TRAVEL SERVICES BASED ON TRANSPORTATION CRITERIA

(71) Applicant: Inspirato LLC, Denver, CO (US)

(72) Inventors: Brad Handler, Denver, CO (US); Cody Holloway, Denver, CO (US)

(73) Assignee: INSPIRATO LLC, Denver, CO (US)

( * ) Notice: Subject to any disclaimer, the term of this patent is extended or adjusted under 35 U.S.C. 154(b) by 159 days.

This patent is subject to a terminal disclaimer.

(21) Appl. No.: 17/381,727

(22) Filed: Jul. 21, 2021

(65) Prior Publication Data

US 2021/0350480 A1    Nov. 11, 2021

Related U.S. Application Data

(63) Continuation of application No. 16/502,226, filed on Jul. 3, 2019, now Pat. No. 11,107,171.

(51) Int. Cl.
*G06Q 50/14* (2012.01)
*G06Q 10/02* (2012.01)
(Continued)

(52) U.S. Cl.
CPC .............. *G06Q 50/14* (2013.01); *G06Q 10/02* (2013.01); *G06Q 10/025* (2013.01);
(Continued)

(58) Field of Classification Search
CPC .... G06Q 50/14; G06Q 50/30; G06Q 30/0283; G06Q 20/28; G06Q 30/0601; G06Q 30/0631
See application file for complete search history.

(56) References Cited

U.S. PATENT DOCUMENTS 10,229,443 B1 *   3/2019   Farre ................. G06Q 30/0621
10,929,889 B1     2/2021   Aggarwal et al.
(Continued)

FOREIGN PATENT DOCUMENTS

CN       114730405       7/2022
WO    WO-2021002890 A1   1/2021

OTHER PUBLICATIONS

"How to Request Multiple Uber Vehicles"; Accessed as of Mar. 16, 2016; WikiHow.com; pp. 1-2; http://www.wikihow.com/Request-Multiple-Uber-Vehicles (Year: 2016).*

(Continued)

*Primary Examiner* — Emmett K. Walsh
*Assistant Examiner* — Michael C Moroney
(74) *Attorney, Agent, or Firm* — BRYAN CAVE LEIGHTON PAISNER LLP

(57) ABSTRACT

Systems and methods are disclosed for providing a subscription travel service. The systems and methods include operations for determining a geographical location of a user of a subscription-based travel service; searching a list of travel services that are available for the user to consume on a travel date to identify candidate travel services; computing a likelihood of consumption value for the user based on transportation criteria associated with arriving at a given travel service in the list of travel services from the geographical location of the user; determining that the likelihood of consumption value for the user is less than a threshold; increasing a travel cost value associated with the given travel service in response to determining that the likelihood of consumption value is less than the threshold; and generating, for display in a graphical user interface to the user, an interactive visual representation of the given travel service.

20 Claims, 8 Drawing Sheets

(51) Int. Cl.
  *G06Q 30/0601* (2023.01)
  *G06Q 30/0202* (2023.01)
  *G06Q 50/30* (2012.01)

(52) U.S. Cl.
  CPC ..... *G06Q 30/0202* (2013.01); *G06Q 30/0619* (2013.01); *G06Q 30/0625* (2013.01); *G06Q 30/0631* (2013.01); *G06Q 30/0641* (2013.01); *G06Q 50/30* (2013.01)

(56) References Cited

U.S. PATENT DOCUMENTS

| | | | |
|---|---|---|---|
| 11,107,171 B2* | 8/2021 | Handler | G06Q 10/025 |
| 2002/0138312 A1* | 9/2002 | Blau | G06Q 30/02 |
| | | | 705/14.69 |
| 2005/0049918 A1* | 3/2005 | Rovner | G06Q 30/0213 |
| | | | 705/14.15 |
| 2008/0059252 A1* | 3/2008 | Boyer | G06Q 10/06 |
| | | | 705/5 |
| 2014/0052714 A1* | 2/2014 | Brodziak | G06F 16/248 |
| | | | 707/722 |
| 2017/0278126 A1* | 9/2017 | Rowley | G06Q 30/0233 |
| 2018/0047091 A1 | 2/2018 | Ogden et al. | |
| 2018/0225595 A1* | 8/2018 | Zakri | G06F 16/2282 |
| 2019/0065564 A1* | 2/2019 | Twig | G06F 16/248 |
| 2021/0004917 A1 | 1/2021 | Handler et al. | |
| 2021/0049523 A1* | 2/2021 | Chen | G06Q 10/047 |

OTHER PUBLICATIONS

U.S. Appl. No. 16/502,226, filed Jul. 3, 2019, Travel Services Based on Transportation Criteria.

"European Application Serial No. 20713489.1, Response to Communication pursuant to Rules 161 and 162 filed Aug. 19, 2022", 27 pgs.

"International Application Serial No. PCT US2020 020400, International Preliminary Report on Patentability dated Jan. 13, 2022", 9 pgs.

"South African Application Serial No. 2021 10495, Voluntary Amendment filed Jan. 4, 2022", 3 pgs.

"U.S. Appl. No. 16/502,226, Notice of Allowance dated Apr. 27, 2021", 31 pgs.

"International Application Serial No. PCT/US2020/020400, International Search Report dated Apr. 24, 2020", 4 pgs.

"International Application Serial No. PCT/US2020/020400, Written Opinion dated Apr. 24, 2020", 7 pgs.

* cited by examiner

FIG. 5A

Hi Julie, below are your available travel services to travel from Georgia

Azure and Samba.

Travel From 12/22-12/28

Overview  Accommodations  Reviews

11 Accommodations

Accommodation
Homes
Rooms/Suites

Bedrooms
☐ 1 Bedroom (6)
☐ 2 Bedrooms (2)
☐ 3 Bedrooms (3)

Amenities    clear
☐ Air Conditioning (11)
☐ Beach Access Within Walking Distance (11)
☐ Children's Programs (3)
☐ Dining within Walking Distance (11)
☐ Fitness Center On Site (8)

Miami/South Beach, Florida
3 Room/Suites worth $3500

1 Hotel south Beach
Miami/South Beach, Florida

Miami/South Beach, Florida

FIG. 5B

TRAVEL SERVICES BASED ON TRANSPORTATION CRITERIA

PRIORITY APPLICATIONS

This application is a continuation of U.S. patent application Ser. No. 16/502,226, filed Jul. 3, 2019, the content of which is hereby incorporated by reference in its entirety.

BACKGROUND

Web-based travel services systems allow a user to search through various travel services available by multiple providers. A user can specify a destination and travel time frame to find matching hotels, rental cars, and airfares along with their corresponding costs. The user can sort the results by price, type and availability of the travel service. After the user finds a suitable hotel, rental car, or airfare, the user can utilize the web-based travel services to reserve the hotel, rental car, or airfare.

BRIEF DESCRIPTION OF THE DRAWINGS

Various ones of the appended drawings merely illustrate example embodiments of the present disclosure and should not be considered as limiting its scope.

FIGS. 5A and 5B are illustrative graphical user interfaces of the travel services system, according to some example embodiments.

DETAILED DESCRIPTION

Figure 1:
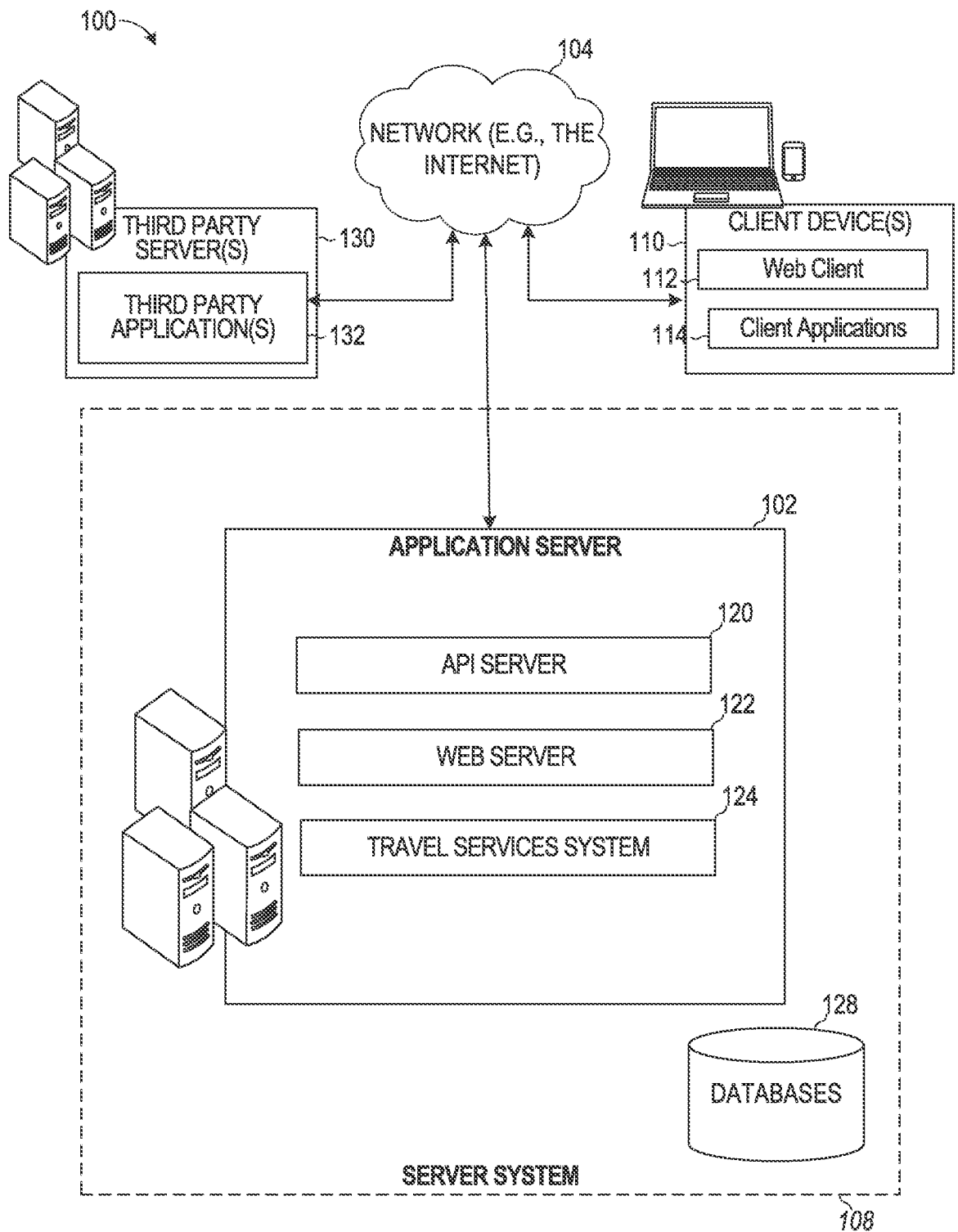
FIG. 1 is a block diagram illustrating a networked system for a subscription based travel service, according to some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

Users typically spend a great deal of time and effort making travel arrangements, such as looking for hotels, airfares, and car rentals that are within their budget. Existing travel sites allow a user to input various travel criteria, such as travel dates and destinations, to search for all the available hotels, airfares, and car rentals that match the travel criteria. The existing travel sites also allow the user to sort and filter results based on a specified cost. While such existing travel sites generally work well for making travel arrangements, there is often a large disparity among cost and availability for the same or similar hotels, airfares, and car rentals across different travel sites. This ends up burdening the user as the user has to search through the available options across multiple travel sites to make sure he or she gets the best price within their budget. Searching through multiple travel sites takes a great deal of time and effort and forces the user to navigate through multiple pages of information and manually compare results to make travel arrangements. Even still, the travel arrangements the user finally settles on may not provide the user with the best available options for their budget.

The disclosed embodiments improve the efficiency of using an electronic device by providing a better way for users to conduct travel, such as by making travel arrangements using a subscription-based travel service. The subscription-based travel service, according to the disclosed embodiments, allows a user to search for travel services and make reservations for travel services (e.g., such as hotels, rental cars, airfares, homes/residences, experiential travel, guided tours, cruises, train fares, private aviation, "glamping," bespoke travel, event-based travel, and/or space travel) for a fixed annual or monthly subscription fee. Specifically, the user can pay a monthly or annual subscription fee and make an unlimited number of reservations for travel services without having to consider budgetary constraints. Namely, the travel service automatically identifies, curates, and generates a predetermined list of all of the best available travel service options for a specified travel period and destinations from which the user can select based on the user's subscription value as a function of the booking start date (e.g., the date on which the user views and selects to reserve a given travel service) and the travel date (e.g., the date on which the selected travel service begins, such as the first night at the hotel). In this way, the amount of time and effort the user has to spend searching for travel services that meet the user's budget are significantly reduced. Also, by providing a single interface and travel site for making travel arrangements that automatically take into account various travel service costs in providing travel services options to the user, the number of steps, pages, and interfaces the user has to navigate through to make travel arrangements are reduced. This provides a better way for a user to consume travel. Namely, the user does not need to search through multiple travel sites and pages of information to find travel arrangements that satisfy the user's needs.

To automatically provide the user with the list of available travel services, the disclosed embodiments receive travel information (e.g., automatically, before the user requests to view a curated list of travel service options or in response to the user specifying the travel information) with a travel date and, in response, compute one or more subscription values as a function of a booking date, the travel date, and one or more transportation criteria. The transportation criteria represents a level of difficulty experienced by the user in reaching a given travel service from a geographical location of the user and includes at least one of expense, number of stops, duration of travel, mode of transportation, and/or level of agony. Specifically, the disclosed embodiments compute a likelihood of consumption value for the user based on the one or more transportation criteria associated with arriving at a given travel service in the list of travel services (e.g., arriving at a particular hotel) from the geographical location of the user. A travel cost value associated with the given travel service is adjusted (increased or decreased) in response to determining that the likelihood of consumption value for the user is less than or greater than the threshold. The disclosed embodiments generate for display, in a graphical user interface to the user, an interactive visual representation of the given travel service that represents the travel cost value and which the user can select to reserve the given travel service.

In some cases, the one or more subscription values each includes an accumulated value portion, representing the total amount the user will have paid for the subscription from the booking date to the travel date, and an amortized value portion, representing an estimate of the total amount of the subscription the user will have paid from the booking date to a given time period, such as a week, relative to the annual subscription cost. In particular, a first subscription value is computed as a function of a booking date, the travel date, and a first set of transportation criteria associated with arriving at each of a first set of travel services in the list of travel services, and a second subscription value is computed as a function of the booking date, the travel date, and a second set of transportation criteria associated with arriving at each of a second set of travel services in the list of travel services. In some cases, the second set of transportation criteria represents a higher level of travel difficulty than the first set of transportation criteria.

In some implementations, the first subscription value includes a first maximum purchase amount that is computed by applying a first weight to a function (e.g., an average) of the amortized value portion and the accumulated value portion of the first subscription value. The second subscription value includes a second maximum purchase amount that is computed by applying a second weight to a function (e.g., an average) of the amortized value portion and the accumulated value portion of the second subscription value. The weights that are applied are determined based on the set of transportation criteria associated with each subscription value. In this way, the second maximum purchase amount can be computed as a higher number than the first maximum purchase amount if the second set of transportation criteria associated with the second subscription value represents a greater level of difficulty of arriving at the destination from the geographical location of the user than the first set of transportation criteria associated with the first subscription value.

A list of travel services that are available on the travel date is searched to identify candidate travel services that each has a first cost (e.g., a cost available through a publicly available database or travel site) that exceeds a previously computed minimum travel value of each of the subscription values of a given user. Then, a subset of the candidate travel services that each have a second cost (e.g., a cost available exclusively to subscribers of the travel service via the subscription travel services system database) that is less than the first and second maximum purchase amounts is selected and generated for display to the user in a graphical user interface using one or more interactive visual representations. Particularly, the transportation criteria associated with reaching each travel service in the list of travel services from the geographical location of the user is determined and used as a basis to compare against the first or second maximum purchase amounts. Namely, second costs of travel services that are associated with the first set of transportation criteria (e.g., that are within a first distance to the geographical location of the user) are compared against the first maximum purchase amount and second costs of travel services that are associated with the second set of transportation criteria (e.g., that are within a second distance to the geographical location of the user that is greater than the first distance) are compared against the greater second maximum purchase amount. As a result, the travel cost value of the travel services associated with the second transportation criteria is increased. The user can select a given one of the displayed visual representations to instruct the system to automatically reserve the travel service associated with the selected visual representation.

According to the disclosed embodiments, users who are geographically located in disparate places are presented different sets of available travel services based on the likelihood that the respective users will consume the available travel services. The likelihood is determined based on at least one of the transportation criteria associated with arriving at the available travel services from the geographical location of the user and/or the time between when the travel service is booked and the time when the travel service is planned to be consumed. As an example, a user who is geographically proximate to a given travel service (e.g., is associated with a set of travel criteria that has a low level of difficulty in arriving at the given travel service) is provided less value for consuming the given travel service (e.g., because the likelihood of the user consuming the given travel service is high) than another user who is far away from the given travel service (e.g., is associated with a set of travel criteria that has a high level of difficulty in arriving at the given travel service).

Specifically, two users who are searching for the same hotel in a particular region may be provided different values for that hotel (e.g., different lengths of stays) based on how likely each user is to reserve a stay at the hotel. As such, a user who has an easy time arriving at the hotel (e.g., because the user is within a threshold distance to the hotel and/or because the user's trip to the hotel takes less than a certain amount of time) is provided a shorter duration of stay as an option to reserve the hotel than another user who has a difficult time arriving at the same hotel (e.g., because the user is further than the threshold distance to the hotel and/or because the user's trip to the hotel takes more than a certain amount of time).

FIG. 1 is a block diagram illustrating a networked system 100 for a subscription based travel service, according to some example embodiments. The system 100 includes one or more client devices such as client device 110. The client device 110 comprises, but is not limited to, a mobile phone, desktop computer, laptop, portable digital assistants (PDA), smart phone, tablet, ultrabook, netbook, laptop, multi-processor system, microprocessor-based or programmable consumer electronic, game console, set-top box, computer in a vehicle, or any other communication device that a user may utilize to access the networked system 100. In some embodiments, the client device 110 comprises a display module to display information (e.g., in the form of graphical user interfaces). In further embodiments, the client device 110 comprises one or more of touch screens, accelerometers, gyroscopes, cameras, microphones, global positioning system (GPS) devices, and so forth. The client device 110 may be a device of a user that is used to access and utilize subscription based travel services via a travel services system 124 implemented by an application server 102.

For example, the client device 110 may be used by a user to navigate to a website of the travel services system 124. In some embodiments, the client device 110 may include a dedicated travel services system 124 application with the same or similar functionality as the website. After accessing the website, the user inputs personal information (e.g., name, address, phone number, payment information, geographical location, home address, and so forth) to subscribe to the travel services system 124. In some embodiments, the subscription fee is paid monthly but can be paid on any other periodic interval (e.g., weekly, daily, every other month, annually, lifetime, and so forth). After subscribing to the travel services system 124, the user is provided with login credentials that can be used to navigate and browse available travel services on the travel services system 124. For example, the user can access the travel services system 124 to browse hotel rooms available in various luxury categories in a selected geographical location on a particular date or range of dates.

In some embodiments, the client device 110 presents a graphical user interface with data entry regions allowing the user to select from a predefined list of travel destinations (e.g., at various geographical locations) available on a travel date input by the user. In some embodiments, the graphical user interface allows the user to manually type in a name of a desired geographical location destination and the desired travel date (e.g., the date the user plans to take the trip and consume the travel service). As the user types in the name of the desired geographical location destination, the travel services system 124 searches through travel destinations available on the travel date that are at the desired geographical location(s) and presents the available travel destinations to the user for selection. In some cases, the list of travel services that are presented to the user are selected based on a likelihood that the user will consume (e.g., reserve or book) the travel services. The likelihood may be determined based on one or more travel criteria associated with reaching the travel services from the geographical location of the user and/or an amount of time between when the travel services are presented to the user for booking and the travel date on which the travel services will be consumed. In some cases, the likelihood is determined based on an output of a machine learning model.

In response to receiving a user selection of one or more of the travel destinations, prior to or during selection of the destination, the client device 110 presents a data entry region for the user to input a specific travel start date (e.g., an arrival date at the hotel) and a number of days for the trip. In some embodiments, the list of available travel services are automatically searched for on a daily basis without receiving the user selection of the travel destination and/or travel start date. The travel services system 124 retrieves subscription information for the user specifying the amount the user pays on a monthly or other periodic basis. Using the subscription information, the travel services system 124 computes one or more subscription values as a function of the booking date and the travel date and a corresponding set of one or more transportation criteria associated with reaching a given set of travel services. The booking date may be computed based on the current date on which the user selection of the travel destination is received and/or the current date on which a list of travel services is searched and curated.

The travel services system 124 utilizes the subscription values and a value guard to search for travel services that satisfy the subscription values and the value guard. The value guard is used as a filter of travel services to ensure that the travel service options presented to the user have a cost and/or value that satisfies a minimum travel value amount and does not exceed a maximum purchase amount corresponding to the subscription value. As an example, a first subscription value is computed as a function of the booking date, the travel date, and a first set of transportation criteria associated with arriving at each travel service of a first set of travel services, and a second subscription value is computed as a function of the booking date, the travel date, and a second set of transportation criteria associated with arriving at each travel service of a second set of travel services. Transportation criteria associated with reaching each of a plurality of travel services from the geographical location of the user is determined. The cost for each travel service is compared to either the first or the second subscription value based on the transportation criteria determined for the travel service.

For example, a first travel service may be determined to be associated with the first set of transportation criteria. As such, the cost of the first travel service may be compared to the first maximum purchase amount rather than the second greater maximum purchase amount to determine whether to include the first travel service in the list presented to the user. If the cost of the first travel service is less than the first maximum purchase amount, then the first travel service is included in the list presented to the user but if the cost of the first travel service is greater than the first maximum purchase amount and less than the second maximum purchase amount, then the first travel service is excluded from the list. As another example, a second travel service may be determined to be associated with the second set of transportation criteria. As such, the cost of the second travel service may be compared to the second maximum purchase amount rather than the first maximum purchase amount to determine whether to include the second travel service in the list presented to the user. If the cost of the second travel service is less than the second maximum purchase amount, then the second travel service is included in the list presented to the user but if the cost of the second travel service is greater than the second maximum purchase amount, then the second travel service is excluded from the list.

In some cases, the second set of transportation criteria represents a higher level of travel difficulty than the first set of transportation criteria. For example, the second set of transportation criteria represents a duration of travel for reaching a travel service from the geographical location of the user that exceeds a threshold and the first set of transportation criteria represents a duration of travel for reaching a travel service from the geographical location of the user that is less than the threshold. As another example, the second set of transportation criteria represents a number of stops, agony, and/or types of transportation modes needed to reach a travel service from the geographical location of the user that is greater than a number of stops, agony and/or types of transportation modes needed to reach a travel service from the geographical location of the user associated with the first set of transportation criteria.

In some implementations, transportation criteria of each travel service may be determined by searching various travel sites to identify a set of transportation criteria that is the quickest, cheapest, and with the least agony for the user to reach the respective travel service from the geographical location of the user. In some implementations, each travel service is associated with different predetermined lists of transportation criteria, with each criteria associated with different geographical locations of users from which transportation originates.

The travel services system 124 provides matching results to the client device 110 for presentation of the results in the graphical user interface using one or more interactive visual representations. The graphical user interface of the client device 110 may be utilized to access reviews, comments, and additional information for each of the travel services represented by the interactive visual representations. In some cases, travel services that are presented to the user on the client device 110 may be ranked or sorted based on the transportation criteria associated with each travel service for the user. As an example, a first travel service that is associated with a first set of transportation criteria representing a low level of difficulty in reaching the first travel service from the geographical location of the user may be ranked lower (and presented at a lower position in the list or not at all) than a second travel service. The second travel service may be associated with a second set of transportation criteria representing a high level of difficulty (and a low likelihood of consumption) and accordingly may be ranked higher than the first travel service in the list. In this way, two different users may be presented the same set of results of travel services but in different ways (e.g., different rankings or organization) based on the geographical locations of the users and the different sets of transportation criteria for the users to reach the travel services. Namely, the first travel service may be determined to be associated with a first set of transportation criteria for a first user based on a first geographical location of the first user while the first travel service may be determined to be associated with a second set of transportation criteria for a second user based on a second geographical location of the second user. Accordingly, if the second set of transportation criteria represents a high level of difficulty in reaching the first travel service, the first travel service may be presented at the top of the list of travel service results presented to the second user and may be positioned at the bottom of the list of travel services presented to the first user, or may not be presented at all to the first user.

The client device 110 receives a user input selecting one of the interactive visual representations for a travel service and communicates the selection to the travel services system 124. The travel services system 124 automatically reserves the travel service (e.g., holds and pays for a room at a hotel) corresponding to the selected interactive visual representation. The client device 110 may present a confirmation page to the user informing the user of the travel service that has been reserved and the travel start date.

In some implementations, the travel services system 124 may limit the number of concurrent travel services the user can reserve. For example, the travel services system 124 may allow the user to select only one travel service reservation at a time, such that the user is prevented from searching for and/or reserving additional travel services until the currently selected travel service that has been reserved expires or is canceled. As another example, the travel services system 124 may only allow the user to reserve three travel services at a time, such that when one of the three travel services expires, the user can reserve an additional travel service. Namely, after the start and end dates for the travel service elapse indicating that the user has utilized the travel service, the client device 110 may allow the user to search for additional travel services to reserve in a similar manner as before. Alternatively, the user can navigate to a cancelation page or graphical user interface using the client device 110 and cancel any reservations previously selected within a cancelation window (e.g., within 72 hours prior to the travel start date). In response to receiving a user request to cancel the travel service, the travel service system 124 may cancel the reservation and the client device 110 may allow the user to search for a new travel service in a similar manner as before.

In some embodiments, the travel services system 124 provides an improved way for users to consume travel. The travel services system 124 performs such improved techniques in three phases or steps. In the first phase or step, the travel services system 124 generates an inventory of travel services by searching travel destinations across a range of dates or specific dates throughout the year. The travel destinations are searched from publicly available information sources (e.g., databases of other travel sites available to non-subscribers of the travel services system 124), by direct access to a predetermined set of travel services, third party sources, proprietary sources, and travel services that have direct relationships and contracts for travel services with the travel services system 124. The travel destinations are searched periodically (e.g., nightly or weekly) using various combinations of travel dates and destinations. The search returns travel services available at various dates throughout the world and includes the total cost for consuming the travel services on the particular combination of dates along with the cancelation policy of each travel service. The cancelation policy may indicate the fee for canceling the travel service once booked which may be free or a nominal charge. A list of transportation criteria is determined for each travel service based on different origin geographical locations of users. Namely, each travel service may be associated with a database that includes different sets of transportation criteria for different geographical locations. As a result, the output of phase one or step one is a collection or database of tens of millions of combinations of travel services (and travel service types), at different ranges of travel start dates, with corresponding prices or costs, corresponding transportation criteria for different geographical locations, and with corresponding cancelation policies.

After the first phase or step, the travel services system 124 performs a second step or phase. In the second step or phase, the collection of the travel services identified in the first phase is curated or filtered in accordance with one or more rules. Specifically, any, all, or a combination of the information associated with each travel service (e.g., the travel start dates, the prices, the travel service type, the destination, the transportation criteria, and the cancelation policy) is analyzed and compared with the one or more rules to exclude and select a list of candidate travel services. In an embodiment, the rules include various criteria (e.g., the booking date or date on which the reservation for a given travel service is made or requested, the price with taxes and fees (cost of the reservation), transportation criteria for a given user's geographical location, and the cancelation fee or policy), which are used to curate or filter the collection of travel services. The rules may vary between users of the travel services system 124 as different users are in geographically disparate locations meaning they are associated with different transportation criteria for reaching the travel services.

Specifically, the rules consider how much the travel services system 124 is willing or allowed (e.g., the maximum purchase amount) to spend for a given travel service which is leveraged against how far in advance the reservation is being made (e.g., the difference between the booking date and the travel start date). The maximum purchase amount may be computed based on various factors including payments received (e.g., the amount a subscriber will actually end up paying from the booking date to the travel date and an amortized amount by week of the subscriber's subscription cost) and the transportation criteria associated with a given user reaching the travel service. Namely, one or more maximum purchase amounts may be computed to be used as a basis for filtering the travel services based on cost. The one or more maximum purchase amounts may each be associated with different sets of transportation criteria, such that a second maximum purchase amount may be greater than a first maximum purchase amount because the second maximum purchase amount is associated with a second set of transportation criteria that represents a greater level of difficulty of arriving at a given travel service than a first set of transportation criteria associated with the first maximum purchase amount. In this way, different maximum purchase amounts are computed for different users based on the geographical locations of the different users and the transportation criteria associated with each of the users in reaching a particular travel service.

In some cases, the amount the subscriber will actually end up paying may be computed by determining how many subscription cycles or how many payments will be collected between the booking date and the travel start date. For example, the subscriber pays monthly on the first day of every month and the booking date is in the middle of a given month and the travel start date is 2 months from the booking date. In such cases, the subscriber will end up paying 2 cycles of subscription fees—two monthly payments—by the time the trip starts. The amortized amount is less granular and represents on a repeated time interval (e.g., daily, monthly, weekly, hourly) basis how much the subscriber would end up paying. The maximum purchase amount is then offset by a margin (weight) which may be positive or negative. The margin (weight) may vary based on how far in advance the reservation is being made (e.g., the difference between the booking date and the travel start date) and/or based on the transportation criteria associated with the given user. In some cases, the margin may be greater for a second set of transportation criteria than the margin for a first set of transportation criteria that is associated with a lower level of difficulty of arriving at a given travel service from a geographical location of a user than the second set of transportation criteria. The margin may vary based on the type of travel service being booked or reserved. For example, the margin may be greater for travel services that include or relate to cruises and smaller for travel services that include or relate to homes/residences.

The travel services system 124 computes a minimum travel value representing the maximum a given user would be willing to pay for the travel service. This may be computed as a percentage (e.g., 80%) of the amount the subscriber would have paid by the time the trip begins. Specifically, the amount is a percentage of the number of subscription cycle payments the subscriber would have made by the travel start date starting from the booking date. This amount is used to remove any travel services that have a cost that is less than the minimum travel value as the subscriber can shop those travel services independently of being a subscriber to the travel services system 124. The travel services system 124 eliminates any duplicates from the travel services and maintains those travel services that have a maximum duration of travel dates. For example, if the travel services system 124 identifies the same hotel having 2, 3 and 5 night stay options in the same time period, the travel services system 124 selects only the 5 night option and removes or filters out the 2 and 3 night stay options during the same time period.

The travel services system 124 searches the actual price or cost of the various travel services and applies a margin to the cost of each travel service. The margin may be positive or negative and may depend on how far in advance the travel date is relative to the booking date. The travel services system 124 filters any travel service that has a cost that exceeds the maximum purchase amount associated with the transportation criteria of the travel service and filters any travel service that has a cost that is below the minimum travel value. For example, travel services system 124 determines that a first travel service is associated with a first set of transportation criteria for reaching the first travel service from a location of the user. Accordingly, the travel services system 124 retrieves a first maximum purchase amount associated with the first set of transportation criteria to determine whether the first travel service has a cost that exceeds the first maximum purchase amount. The first travel service is filtered from the list of travel services presented to the user in response to the travel services system 124 determining that the first travel service has a cost that exceeds the first maximum purchase amount.

Similarly, travel services system 124 determines that a second travel service is associated with a second set of transportation criteria for reaching the second travel service from a location of the user. In this case, the travel services system 124 retrieves a second maximum purchase amount associated with the second set of transportation criteria to determine whether the second travel service has a cost that exceeds the second maximum purchase amount. Namely, the travel services system 124 compares the cost of the second travel service to the second maximum purchase amount rather than the first maximum purchase amount because the second travel service is associated with the second transportation criteria. In such circumstances, the second travel service may have a cost that exceeds the first maximum purchase amount but the second travel service is not removed or filtered from the list presented to the user because the second travel service may have a cost that does not exceed the second maximum purchase amount. This results in greater or increased travel cost value being provided to the user for the second travel service because there is a lower likelihood that the user will consume or reserve the second travel service given the second set of transportation criteria that indicates it is rather difficult for the user to reach the second travel service. The travel services system 124 applies an additional filter based on cancelation policies of travel services that do not satisfy a given cancelation policy criteria.

In some cases, based on a subscription type of a given user, only one maximum purchase amount is computed for the given user, which may be independent of the transportation criteria of the user reaching the travel service from the geographical location of the user. For example, travel services system 124 may determine that the subscription type of the user allows the user to book travel for one or more other users in different geographical locations than the given user. In such cases, the travel services system 124 may not adjust the maximum purchase amount to create multiple maximum purchase amounts based on the transportation criteria. Namely, the travel services system 124 may compute a single maximum purchase amount based on the amount a subscriber will actually end up paying from the booking date to the travel date and an amortized amount by week of the subscriber's subscription cost. This single maximum purchase amount is used to filter out travel services that have costs that exceed the maximum purchase amount.

In some embodiments, the travel services system 124 presents the filtered list of travel services as options for the user or subscriber to select to make a reservation. The user can further filter the list based on various criteria (e.g., travel dates, travel destinations, etc.). In some embodiments, the travel services system 124 presents to a user a comparison of each travel service that is presented against what is available for the same travel service on a publicly available or other travel site. Specifically, the travel services system 124 presents next to each travel service or next to a portion of travel services an identification of another booking travel site that has the same travel service and the cost for booking that same travel service on the another booking travel site. This cost that is presented for comparison may be retrieved from storage based on what is in the collection that is analyzed and filtered to generate the list and/or may be determined automatically by accessing the other travel site, executing a search for the particular travel service and the particular range of travel dates, and retrieving the cost presented on the other travel site based on the executed search.

One or more users may be a person, a machine, or other means of interacting with the client device 110. In example embodiments, the user may not be part of the system 100 but may interact with the system 100 via the client device 110 or other means. For instance, the user may provide input (e.g., touch screen input or alphanumeric input) to the client device 110 and the input may be communicated to other entities in the system 100 (e.g., third-party servers 130, server system 108, etc.) via a network 104. In this instance, the other entities in the system 100, in response to receiving the input from the user, may communicate information to the client device 110 via the network 104 to be presented to the user. In this way, the user interacts with the various entities in the system 100 using the client device 110.

The system 100 further includes a network 104. One or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

The client device 110 may access the various data and applications provided by other entities in the system 100 via web client 112 (e.g., a browser, such as the Internet Explorer® browser developed by Microsoft® Corporation of Redmond, Washington State) or one or more client applications 114. The client device 110 may include one or more client applications 114 (also referred to as "apps") such as, but not limited to, a web browser, messaging application, electronic mail (email) application, an e-commerce site application, a mapping or location application, an online home buying and selling application, a travel services application, a real estate application, and the like.

In some embodiments, one or more client applications 114 are included in a given one of the client device 110 and configured to locally provide the user interface and at least some of the functionalities, with the client application 114 configured to communicate with other entities in the system 100 (e.g., third-party servers 130, server system 108, etc.), on an as-needed basis, for data and/or processing capabilities not locally available (e.g., to access location information, to access travel services information, such as cost and availability, to authenticate a user, to verify a method of payment, etc.). Conversely, one or more applications 114 may not be included in the client device 110, and then the client device 110 may use its web browser to access the one or more applications hosted on other entities in the system 100 (e.g., third-party servers 130, server system 108, etc.).

A server system 108 provides server-side functionality via the network 104 (e.g., the Internet or WAN) to one or more third-party servers 130 and/or one or more client devices 110. The server system 108 includes an application server 102 that implements an application program interface (API) server 120, a web server 122, and a travel services system 124, that may be communicatively coupled with one or more databases 128. The one or more databases 128 may be storage devices that store data related to users of the system 108, applications associated with the system 108, cloud services, travel services data, one or more machine learning techniques and so forth. The one or more databases 128 may further store information related to third-party servers 130, third-party applications 132, client devices 110, client applications 114, users, and so forth. In one example, the one or more databases 128 may be cloud-based storage.

In one example, the one or more databases 128 may be cloud-based storage. The one or more databases 128 may store subscription information for one or more users of the travel services system 124. The subscription information may identify users of the travel services system 124, the subscription start dates of the users, the subscription fee of the users, the geographical locations of the users, the total amount paid-to-date for a subscription of the users, and one or more travel services activities of the users. The travel services activities may include any combination of the number of reservations made in a given time period (e.g., within a given subscription year) by each user, the subscription duration (e.g., measured from the subscription start date to the present date) of each user, the booking duration (e.g., measured from the booking date to the travel date) of each user, the distance to the travel destination of each user (e.g., measured from an address of the user and the location of reserved travel destinations), the margin amount (e.g., how much profit was made in aggregate during the course of the subscription) for each user, the cancelation frequency (e.g., how often the user cancels a reservation made), and/or the reservation frequency (e.g., how much time elapses on average between the end of one reservation and the start of another).

The one or more databases 128 may store the reservations (e.g., the destination and the travel start date and/or duration) of travel services of each user or subscriber of the travel services system 124. The one or more databases 128 may store a list of all the available, or a selected set, of travel services in one or more geographical regions or destinations along with reviews and/or detailed information about the travel services. The one or more databases 128 may store first and second costs on a nightly basis or on some other periodic interval (e.g., per 6 night basis) for each travel service. The first cost that is stored in the one or more databases 128 may represent the cost for the travel service that is provided to non-subscribers of the travel services system 124 and is available by directly making the reservation through a dedicated server of the travel service and/or by making the reservation through an existing travel service search interface. The one or more databases 128 may access a dedicated existing travel service search interface on a periodic basis (e.g., nightly or weekly) to obtain and download the first cost of each, or a selected set, of travel services. The first cost may be computed by selecting a specified travel duration (e.g., 6 nights) and multiplying the per night rate (provided by the travel service) by the specified travel duration. The second cost of each travel service may be a dedicated cost that is changed on an annual or monthly basis and is provided by contract between the travel services system 124 and the corresponding travel service. The second cost may only be available to users who subscribe to the travel services system 124. The second cost of each travel service may represent the cost for consuming the travel service during a specified travel duration (e.g., 6 nights).

The one or more databases 128 may store the cancelation policy of each travel service indicating how much time in advance of the reservation start date at a given travel service the travel service reservation can be canceled without penalty (e.g., to receive a full refund). The one or more databases 128 may store the cost for canceling a given travel service outside of the cancelation policy. The one or more databases 128 may store an expected margin on a per user basis. The expected margin may increase over time (e.g., for subscribers classified as very active) or decrease over time (e.g., for subscribers classified as not very active). The expected margin may increase or decrease based on the transportation criteria associated with reaching a given travel service from a geographical location of the user. In this way, different travel services or destinations may be associated with different expected margins on the basis of the transportation criteria or level of difficulty each respective user experiences in reaching the respective travel service or destination. The expected margin may change by a predetermined factor based on a difference between a booking date and a travel start date (e.g., the margin may change based on how far in advance a user is making the reservation). This may be used to reduce the maximum purchase amount by a first factor if the reservation is made less than a predetermined number of days in advance of the travel date. This may be used to increase the maximum purchase amount by a second factor if the reservation is made more than a predetermined number of days in advance of the travel date.

The server system 108 may be a cloud computing environment, according to some example embodiments. The server system 108, and any servers associated with the server system 108, may be associated with a cloud-based application, in one example embodiment.

The server system 108 includes a travel services system 124. The travel services system 124 includes one or more modules, storage devices, and databases. The storage devices in the travel services system 124 store various travel services activities for each user, travel services activities training data, and one or more machine learning techniques for classifying users of the travel services system 124. The modules in travel services system 124 are configured to compute components of a subscription value, compute value guards, and search for available travel services to provide to the client device 110 in response to receiving a request for travel services at a given destination and time frame. The modules in travel services system 124 are configured to receive a user selection of one of the travel services matching the request and reserve the selected travel service for the user. The modules in travel services system 124 are configured to determine whether the number of pending reservations for a given user exceed an allowable number of pending reservations (e.g., more than one, or more than three) and, in response, prevent the user from making further reservations until the number of pending reservations is below the allowable number (e.g., by canceling a pending reservation or waiting for the reservation to expire).

The modules in travel services system 124 are configured to train a machine learning technique to classify a given user or subscriber using the travel services activities of the user or subscriber by establishing relationships between known travel services activities and known or manually assigned classifications to users or subscribers. The modules in travel services system 124 are configured to filter the available travel services provided to a given client device 110 based on the classification of the user of the client device 110, transportation criteria, and/or cancelation policies of the various travel services. The details of the travel services system 124 are provided below in connection with FIG. 2.

The system 100 further includes one or more third-party servers 130. The one or more third-party servers 130 may include one or more third-party application(s) 132. The one or more third-party application(s) 132, executing on third-party server(s) 130, may interact with the server system 108 via API server 120 via a programmatic interface provided by the API server 120. For example, one or more the third-party applications 132 may request and utilize information from the server system 108 via the API server 120 to support one or more features or functions on a website hosted by the third party or an application hosted by the third party. The third-party website or application 132, for example, may provide software version analysis functionality that is supported by relevant functionality and data in the server system 108.

Third-party servers 130 may include an existing non-subscription based travel service. Such non-subscription based travel services can be used to search for travel services at a first cost available to non-subscribers of the travel services system 124. The travel services system 124 may query the third-party servers 130 on a periodic basis to obtain the first costs for the travel services provided by the travel services system 124. The first costs may represent a per-night rate of the travel services multiplied by a predetermined number of nights (e.g., 6 nights).

Figure 2:
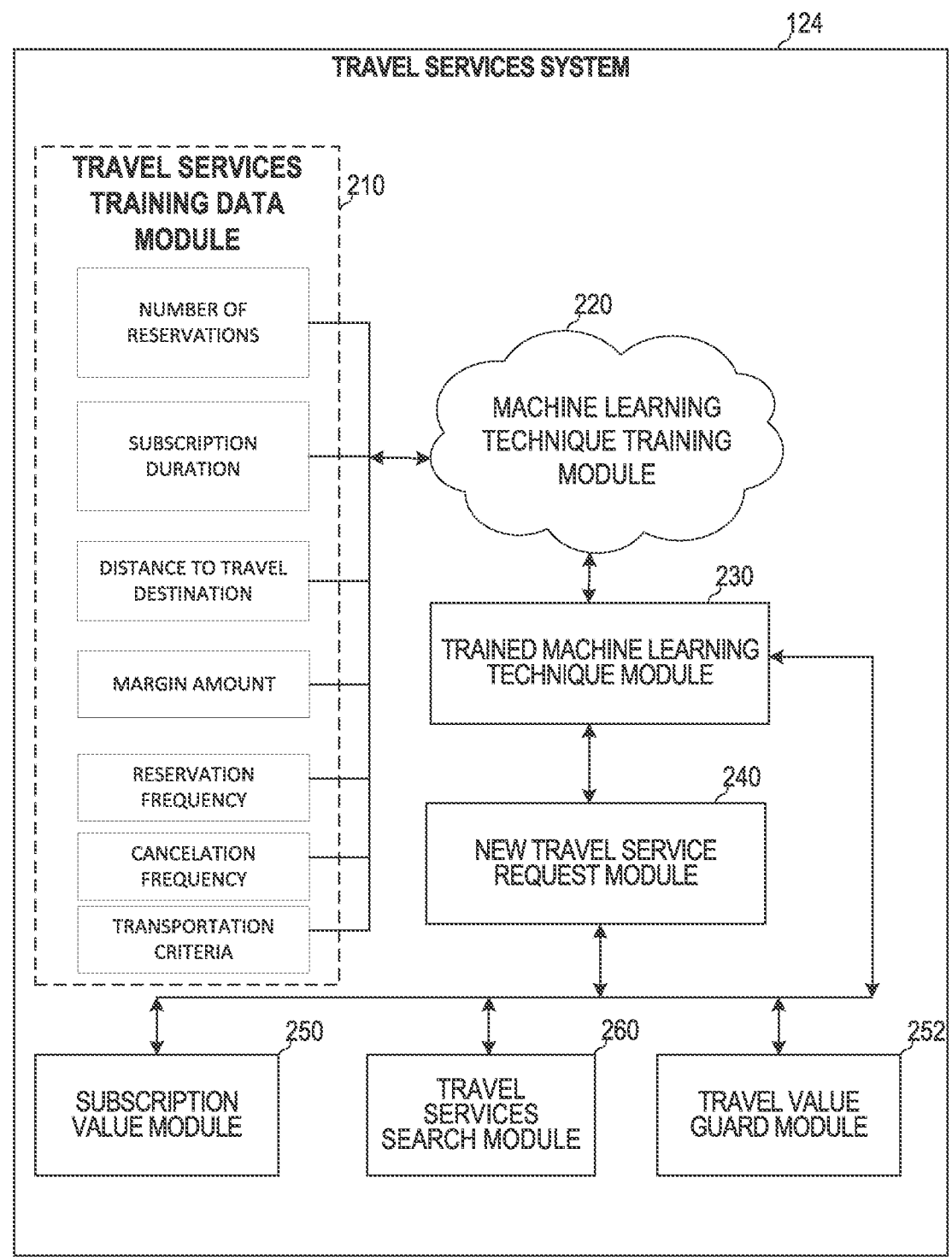
FIG. 2 illustrates a travel services system, according to some example embodiments.

FIG. 2 illustrates a travel services system 124, according to some example embodiments. The travel services system 124 includes a travel services training data module 210, a machine learning technique training module 220, a trained machine learning technique module 230, a new travel service request module 240, a subscription value module 250, a travel services search module 260, and a travel value guard module 252. In some implementations, some modules of the travel services system 124 may be implemented on server system 108 and others may be implemented on third party servers 130 or client device 110. In some implementations, all of the modules of the travel services system 124 are implemented on server system 108, on third party servers 130, or on client device 110. In such cases, server system 108 communicates information to third party servers 130 based on the modules implemented and vice versa.

The new travel service request module 240 may communicate with the client device 110 to receive parameters and criteria for a new travel service request. For example, via the graphical user interface of the client device 110, the user can select a travel destination or geographical location and can, optionally, input the desired trip start date, end date, and/or trip length. The new travel service request module 240 may communicate this user selection to the travel services search module 260 to identify a list of available travel services. The new travel service request module 240 may communicate an identifier of the user of the client device 110 to the subscription value module 250. In some embodiments, the parameters are automatically determined and computed on a nightly basis and used to curate a list of travel services over the course of a given user. In such cases, the user may enter a travel destination and the curated list is presented with previously selected travel dates (e.g., travel dates not inputted or selected by the user). In such cases, the new travel service request module 240 may, on a periodic basis (e.g., nightly) retrieve subscription values for one or more users, computed based on transportation criteria associated with each of the users in reaching the various travel destinations. The new travel service request module 240 may also retrieve one or more travel destinations along with the corresponding transportation criteria associated with the geographical location of the user. The new travel service request module 240 provides the subscription values and the travel destinations, together with the corresponding transportation criteria, as the selection to the travel services search module 260. In this way, the travel services search module 260 identifies available travel services across a range of dates for one or more users and curates such a list for subsequent presentation to the user. The user can simply enter a desired destination, and the available and curated list of travel services at the destination, together with the available travel dates, are presented to the user.

The travel services search module 260 may communicate with the subscription value module 250 to obtain the subscription values for the user of the client device 110. The subscription value module 250 may communicate with the databases 128 to obtain the booking date and the subscription cost of the identified user along with a geographical location of the user. The booking date may be the current date indicating when the search module 260 conducts the search for available travel services and/or the date on which the user requests to view available travel services is received from the new travel service request module 240. The subscription value module 250 may compute the subscription values based on various parameters: an aggregated subscription cost parameter, an amortized subscription cost parameter, and a set of transportation criteria. In an example, the subscription value module 250 computes a first subscription value as an average of the aggregated and the amortized subscription cost parameters and a first set of transportation criteria and computes a second subscription value as an average of the aggregated and the amortized subscription cost parameters and a second set of transportation criteria.

For example, based on the data provided by the user, the subscription value module 250 may determine that the trip is scheduled to start 10 weeks from the present time. In such cases, the subscription value module 250 computes an estimate of the total amount the user will pay for the subscription by aggregating the total amount that will be paid from the present time until 10 weeks from the present time. Namely, the subscription value module 250 assumes the user will continue paying for the subscription until the travel start date from the booking date and estimates how much the user would have paid for the subscription from the current booking date until the future travel start date. As an example, if the subscription costs $2500 per month, the subscription value module 250 may determine that the trip will start 10 weeks from the present day and, in the next 10 weeks, three months' worth of subscription fees (e.g., $7500) will be paid (assuming the fee is paid on the first day of every month). Accordingly, the subscription value module 250 may compute $7500 as the aggregated subscription cost parameter of the subscription value that will be paid from present time (the booking date) until the trip start time.

The subscription value module 250 may also compute as the subscription value an amortized amount of the subscription cost over an annual basis. For example, the subscription value module 250 may determine $30,000 as the total cost of the subscription for the entire year (e.g., by multiplying the number of months in a year, 12, by the monthly subscription fee, $2500). The subscription value module 250 may amortize the yearly subscription cost on a specified repeated period (e.g., daily, monthly, hourly, weekly) basis to determine the amount of the subscription paid from the booking date until the travel start date. For example, if the trip is planned to start in 10 weeks, the subscription value module 250 computes $5,769 as the amortized subscription cost parameter of the subscription value, which is a total of 10 weeks' worth of the weekly subscription cost (e.g., annual subscription fee $30,000 divided by 52 weeks per year and multiplied by 10 weeks).

The subscription value module 250 may compute the first and second subscription values as a function of the aggregate subscription cost expected to have been paid by the time the trip starts and the amortized subscription cost by the time the trip starts as measured from the booking date and based on different transportation criteria. For example, if the user plans the trip to start in 10 weeks from today (the booking date), the subscription value module 250 computes an average of $7,500 and $5,769. Then, the subscription value module 250 computes the first subscription value by applying a first weight (e.g., multiplying) to the average and computes the second subscription value by applying a second weight to the average. The value of the first and second weights may be based on the transportation criteria associated with the different subscription values. For example, transportation criteria associated with a first level of travel difficulty or agony in reaching a given destination may be used to compute a first weight value (e.g., 1.0) and transportation criteria associated with a second level of travel difficulty or agony (that is greater or more difficult than the first level of travel difficulty or agony) in reaching a given destination may be used to compute a second weight value (e.g., 1.3). In this way, the second subscription value may be 30% greater (resulting in 30% more travel cost value being provided to a user) than the first subscription value.

The subscription value module 250 provides the parameters of the subscription values to the travel value guard module 252. The travel value guard module 252 is configured to compute a guard range having a minimum travel value and a maximum purchase amount based on the subscription values. The guard range ensures that the travel services identified by the travel services search module 260 satisfy minimum parameters that ensure a subscriber receives a better deal or bargain than making the same reservation for the travel service through another travel service system (e.g., a travel service system provided by the third-party servers 130). The guard range also ensures that the travel services identified by the travel services search module 260 satisfy a margin amount that provides a positive or negative level of profitability to the travel services system 124. The margin amount may be computed based on a difference between the booking date and the travel date, such that the margin is greater when the difference is smaller than a threshold and is lower when the difference is greater than a threshold. Namely, the minimum travel value is used to ensure that travel service results provided to the user have a value, as determined by the first cost associated with the travel services, that is greater than the minimum travel value. Also, the maximum purchase amounts of each subscription value are used to ensure that the travel service results provided to the user are not valued, as determined by the second cost associated with the travel services, greater than the respective maximum purchase amount. In some cases, the first and second costs may be the same values and in other cases they are different values.

As an example, the travel value guard module 252 computes the minimum travel value as a function of the aggregated (or accumulated) subscription cost parameter of the subscription value. Specifically, the travel value guard module 252 computes the minimum travel value as 80 percent of the aggregated (or accumulated) subscription cost parameter. Accordingly, if the aggregated subscription cost is determined to be $7,500, the minimum travel value is computed to be $6,000 (e.g., 80 percent of $7,500).

As an example, the travel value guard module 252 computes the maximum purchase amounts for each of the first and second subscription values as a function of an adjusted average of the aggregated and amortized subscription cost parameters and the corresponding first and second weights. The average may be adjusted based on a margin amount or value that is associated with the user retrieved by the travel value guard module 252 from the databases 128. Specifically, the travel value guard module 252 computes a first maximum purchase amount as an average of the aggregated (or accumulated) subscription cost parameter and the amortized subscription cost parameter offset by the retrieved margin and the first weight and computes a second maximum purchase amount as an average of the aggregated (or accumulated) subscription cost parameter and the amortized subscription cost parameter offset by the retrieved margin and the second weight.

The travel services search module 260 receives the guard range from the travel value guard module 252 and searches for travel services that fall within the guard range and that satisfy the travel criteria (optionally) supplied by the user received from the new travel service request module 240. As an example, the travel services search module 260 first searches for all of the travel services that are available on the travel date range (e.g., the travel start date and the travel duration) received from the client device 110 and/or received automatically by the travel service request module 240. The travel services search module 260 restricts or limits the search to those travel services that are within a specified range (e.g., 25 miles) of the travel destination or geographical region received from the client device 110 and/or received automatically by the travel service request module 240. In some cases, the travel services search module 260 access a predefined list of travel destinations and searches all of the available travel services available in 6-day periods (or other defined periods) during the course of the entire year. The travel services search module 260 searches various combinations of travel dates and destinations to generate millions of combinations of possible travel destinations at various periods.

After travel services search module 260 identifies the list of travel services that are available on the travel start date and that meet the travel destination or geographical region parameters, the travel services search module 260 obtains first and second costs associated with each of the travel destinations from the databases 128 and determines one or more transportation criteria for a given user to reach each of the travel destinations. The travel services search module 260 compares the first or second costs of each of the identified travel services to the minimum travel value received from the travel value guard module 252. The travel services search module 260 removes or filters from the list any travel service that has a first or second cost that is below the minimum travel value. The travel services search module 260 may also filter out and remove any travel destination that has a cancelation policy that fails to satisfy cancelation policy criteria.

The travel services search module 260 removes or filters from the list any travel service that has a second cost that is above the maximum purchase amount corresponding to the determined transportation criteria of the travel service received from the travel value guard module 252. Specifically, travel services search module 260 obtains transportation criteria determined for a first travel service and retrieves the maximum purchase amount associated with the obtained transportation criteria. For example, if the first travel service is determined to be associated with a first set of transportation criteria for the geographical location of the user, the travel services search module 260 obtains the first maximum purchase amount. In such cases, the first travel service is filtered or removed from the list of travel services presented to the user if the first travel service has a cost that exceeds the first maximum purchase amount. On the other hand, if the first travel service is determined to be associated with a second set of transportation criteria for the geographical location of the user, the travel services search module 260 obtains the second maximum purchase amount. In such cases, the first travel service is filtered or removed from the list of travel services presented to the user if the first travel service has a cost that exceeds the second maximum purchase amount rather than the first maximum purchase amount. The second maximum purchase amount may be greater than the first maximum purchase amount if the second transportation criteria represents a greater level of difficulty or agony in reaching a given destination than the first transportation criteria.

In some embodiments, to determine the first or second cost, the travel services search module 260 may multiply a nightly first and/or second cost of each travel service during the travel period by the number of days in the travel service request. In some cases, the travel services search module 260 communicates with the trained machine learning technique module 230 to obtain a classification for the user making the travel request and further filters or removes travel services based on the classification of the user. The travel services search module 260 provides the filtered list of travel services back to the new travel service request module 240 for provision to the client device 110 and presentation to the user for selection and requesting to make a reservation.

To classify users, the trained machine learning technique module 230 is initially trained based on training data. Specifically, the travel services training data module 210 includes a list of travel services activities associated with various subscribers of the travel services system 124. The travel services activities are obtained by the travel services training data module 210 from database 128 and/or from third party server 130. For example, the travel services training data module 210 obtains the number of reservations made by a user from database 128 and obtains the cancelation frequency from third party server 130. The travel services training data module 210 may access training data including the number of reservations made by each user, transportation criteria of each user that is typically experienced or used by the user booking a reservation, the subscription duration of each user, the distance to travel destination of each user, the margin amount of each user, the reservation frequency of each user, the cancelation frequency of each user, and an assigned classification of each user. The classification may represent a level of activity of each user from not active, to medium active, to very active. The classification is used to control and filter the types and quantity of travel services provided to different users. This can be used as a measure to ensure that users who are not very active are provided a greater quantity of a better type of travel services than a very active user to incentivize the non-active user to utilize the travel services system 124.

In some embodiments, machine learning technique training module 220 is trained to predict a classification for a subscriber of the travel services system 124 by establishing a relationship between one or more known travel services activities of other users provided by travel services training data module 210 and the corresponding known classification of the other users provided by the travel services training data module 210. In some embodiments, machine learning technique training module 220 is trained to predict a likelihood of consumption of a given travel service for a subscriber of the travel services system 124 by establishing a relationship between one or more known travel services activities of other users (e.g., destinations the other users booked) and the locations of the other users provided by travel services training data module 210 and the corresponding transportation criteria such users experienced in reaching the destinations. Namely, the machine learning technique is trained to predict the types of transportation criteria a given user is willing to experience in reaching a destination.

Machine learning is a field of study that gives computers the ability to learn without being explicitly programmed. Machine learning explores the study and construction of algorithms, also referred to herein as tools, that may learn from existing data and make predictions about new data. Such machine-learning tools operate by building a model from example training data (e.g., travel services activity information) in order to make data-driven predictions or decisions expressed as outputs or assessments. Although example embodiments are presented with respect to a few machine-learning tools, the principles presented herein may be applied to other machine-learning tools. In some example embodiments, different machine-learning tools may be used. For example, Logistic Regression (LR), Naive-Bayes, Random Forest (RF), neural networks (NN), matrix factorization, and Support Vector Machines (SVM) tools may be used for classifying a given user based on travel activities of the user.

The machine-learning algorithms utilize features (e.g., various combinations of travel services activities performed by other users in interacting and making reservations with the travel services system 124) for analyzing the data to generate assessments (e.g., a classification of the users). A feature is an individual measurable property of a phenomenon being observed. The concept of a feature is related to that of an explanatory variable used in statistical techniques such as linear regression. Choosing informative, discriminating, and independent features is important for effective operation of pattern recognition, classification, and regression. Features may be of different types, such as numeric features, strings, and graphs.

In one example embodiment, the features may be of different types and may include one or more of a number of reservations made by each user, the subscription duration of each user, the distance to travel destination of each user, the margin amount of each user, the transportation criteria experienced or used by the users in reaching destinations, geographical locations of the users and the destinations, the reservation frequency of each user, and the cancelation frequency of each user. Transportation criteria experienced or used by users in reaching destinations includes any combination of total duration of travel in reaching the destination from the geographical location of the user, modes of transportation used in reaching the destination from the geographical location of the user, number of stops along the trip that were taken in reaching the destination from the geographical location of the user, and the like.

The machine-learning algorithms utilize the training data to find correlations among the identified features that affect the outcome or assessment (e.g., the known or assigned classification of each user). In some example embodiments, the training data includes labeled data, which is known data for one or more identified features and one or more outcomes, such as the assigned classification of the user.

Once the training data are collected and processed, machine learning technique training module 220 model can be built using either statistical learning or machine learning techniques. In one embodiment, regression analysis can be used to build the machine learning technique training module 220 model. Regression analysis is a statistical process for estimating the relationships among variables. There are a number of known methods to perform regression analysis. Linear regression or ordinary least squares regression, among others, are "parametric" in that the regression function is defined in terms of a finite number of unknown model parameters that can be estimated from training data. For days to pending prediction, a regression model (e.g., Equation 1) can be defined, for example, as:

$$H \approx f(X, \beta), \quad \text{(Equation 1)}$$

where "H" denotes the known days to pending amount for a set of properties, "X" denotes a vector of input variables (e.g., any one of the travel services activities associated with the set of users), and "β" denotes a vector of unknown parameters to be determined or trained for the regression model.

The training data that include travel services activities of various users and the corresponding classification (which can be manually or automatically specified for each user) provide a set of known H values (e.g., the classification of a user) having corresponding X values (e.g., feature vectors extracted from the travel services activities). Using these data, the model parameter β can be computed using data fitting techniques such as least squares, maximum likelihood, or the like. Once β is estimated, the model can then compute H (e.g., a user travel services classification) for a new set of X values (e.g., feature vectors extracted from a new set of travel services activities). As another example, the training data that include travel services activities of various users and the corresponding classification (which can be manually or automatically specified for each user) provide a set of known H values (e.g., the likelihood of consumption of a given travel service (based on geographical location of the travel service and a user) and/or the transportation criteria a given user is willing to experience) having corresponding X values (e.g., feature vectors extracted from the travel services activities). Using these data, the model parameter β can be computed using data fitting techniques such as least squares, maximum likelihood, or the like. Once β is estimated, the model can then compute H (e.g., a user travel services classification) for a new set of X values (e.g., feature vectors extracted from a new set of travel services activities).

Machine learning techniques train models to accurately make predictions on data fed into the models (e.g., what was said by a user in a given utterance; whether a noun is a person, place, or thing; what the weather will be like tomorrow). During a learning phase, the models are developed against a training dataset of inputs to optimize the models to correctly predict the output for a given input. Generally, the learning phase may be supervised, semi-supervised, or unsupervised, indicating a decreasing level to which the "correct" outputs are provided in correspondence to the training inputs. In a supervised learning phase, all of the outputs are provided to the model and the model is directed to develop a general rule or algorithm that maps the input to the output. In contrast, in an unsupervised learning phase, the desired output is not provided for the inputs so that the model may develop its own rules to discover relationships within the training dataset. In a semi-supervised learning phase, an incompletely labeled training set is provided, with some of the outputs known and some unknown for the training dataset.

Models may be run against a training dataset for several epochs (e.g., iterations), in which the training dataset is repeatedly fed into the model to refine its results. For example, in a supervised learning phase, a model is developed to predict the output for a given set of inputs and is evaluated over several epochs to more reliably provide the output that is specified as corresponding to the given input for the greatest number of inputs for the training dataset. In another example, for an unsupervised learning phase, a model is developed to cluster the dataset into n groups and is evaluated over several epochs as to how consistently it places a given input into a given group and how reliably it produces the n desired clusters across each epoch.

Once an epoch is run, the models are evaluated and the values of their variables are adjusted to attempt to better refine the model in an iterative fashion. In various aspects, the evaluations are biased against false negatives, biased against false positives, or evenly biased with respect to the overall accuracy of the model. The values may be adjusted in several ways depending on the machine learning technique used. For example, in a genetic or evolutionary algorithm, the values for the models that are most successful in predicting the desired outputs are used to develop values for models to use during the subsequent epoch, which may include random variation/mutation to provide additional data points. One of ordinary skill in the art will be familiar with several other machine learning algorithms that may be applied with the present disclosure, including linear regression, random forests, decision tree learning, neural networks, deep neural networks, and so forth.

Each model develops a rule or algorithm over several epochs by varying the values of one or more variables affecting the inputs to more closely map to a desired result, but as the training dataset may be varied, and is preferably very large, perfect accuracy and precision may not be achievable. A number of epochs that make up a learning phase, therefore, may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the $n^{th}$ epoch, the learning phase may end early and use the produced model satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs—having reached a performance plateau—the learning phase for the given model may terminate before the epoch number/computing budget is reached.

Once the learning phase is complete, the models are finalized. In some example embodiments, models that are finalized are evaluated against testing criteria. In a first example, a testing dataset that includes known outputs for its inputs is fed into the finalized models to determine an accuracy of the model in handling data on which it is has not been trained. In a second example, a false positive rate or false negative rate may be used to evaluate the models after finalization. In a third example, a delineation between data clusterings is used to select a model that produces the clearest bounds for its clusters of data. In some embodiments, the machine learning technique training module 220 is trained to establish a relationship to classify a user based on a logistic regression of one or more features (e.g., training data received from travel services training data module 210).

After being trained, the machine learning technique is provided to trained machine learning technique module 230. In one example, the coefficient values of the machine learning technique (e.g., the linear model) are stored in a storage of trained machine learning technique module 230. Trained machine learning technique module 230 is configured to receive new travel services activities of a new user from new travel service request module 240. For example, the new travel service request module 240 receives a user input that identifies a desired travel destination and travel dates and accesses previously stored interaction information for the user (e.g., the number of prior reservations made by the user and the distance traveled by the user from the user's home address to the travel destinations). The new travel service request module 240 accesses database 128 and/or server 130 to obtain the travel services activities for the new user. For example, new travel service request module 240 obtains the number of reservations previously made by the user, the subscription duration of the user, the transportation criteria the user experienced in reaching destinations, the distance traveled by the user to the destinations, the margin amount stored for the user, the reservation frequency of the user, and/or the cancelation frequency of the user. The new travel service request module 240 instructs the trained machine learning technique module 230 to apply the trained machine learning technique using the previously computed coefficients to the data provided by the new travel service request module 240. Trained machine learning technique module 230 provides a classification for the new user based on the data provided by the new travel service request module 240. In another example, trained machine learning technique module 230 provides a likelihood of consumption for each travel service and/or transportation criteria for the new user based on the data provided by the new travel service request module 240.

In one example, after being trained, the machine learning technique training module 220 determines that a new user has a low likelihood of consumption (e.g., a likelihood of consumption that is below a threshold) for a given travel service. This is because the machine learning technique training module 220 determines that the new user is willing to experience a first set of transportation criteria in reaching a destination and that the given travel service is associated with a second set of transportation criteria. As a result, the system increases a travel cost value for the given travel service for the new user based on the determination provided by the machine learning technique training module 220. Alternatively, after being trained, the machine learning technique training module 220 determines that a new user has a high likelihood of consumption for a given travel service (e.g., a likelihood of consumption that exceeds the threshold). This is because the machine learning technique training module 220 determines that the new user is willing to experience a first set of transportation criteria in reaching a destination and that the given travel service is associated with the first set of transportation criteria. As a result, the system decreases or maintains a travel cost value for the given travel service for the new user based on the determination provided by the machine learning technique training module 220.

Figure 3:
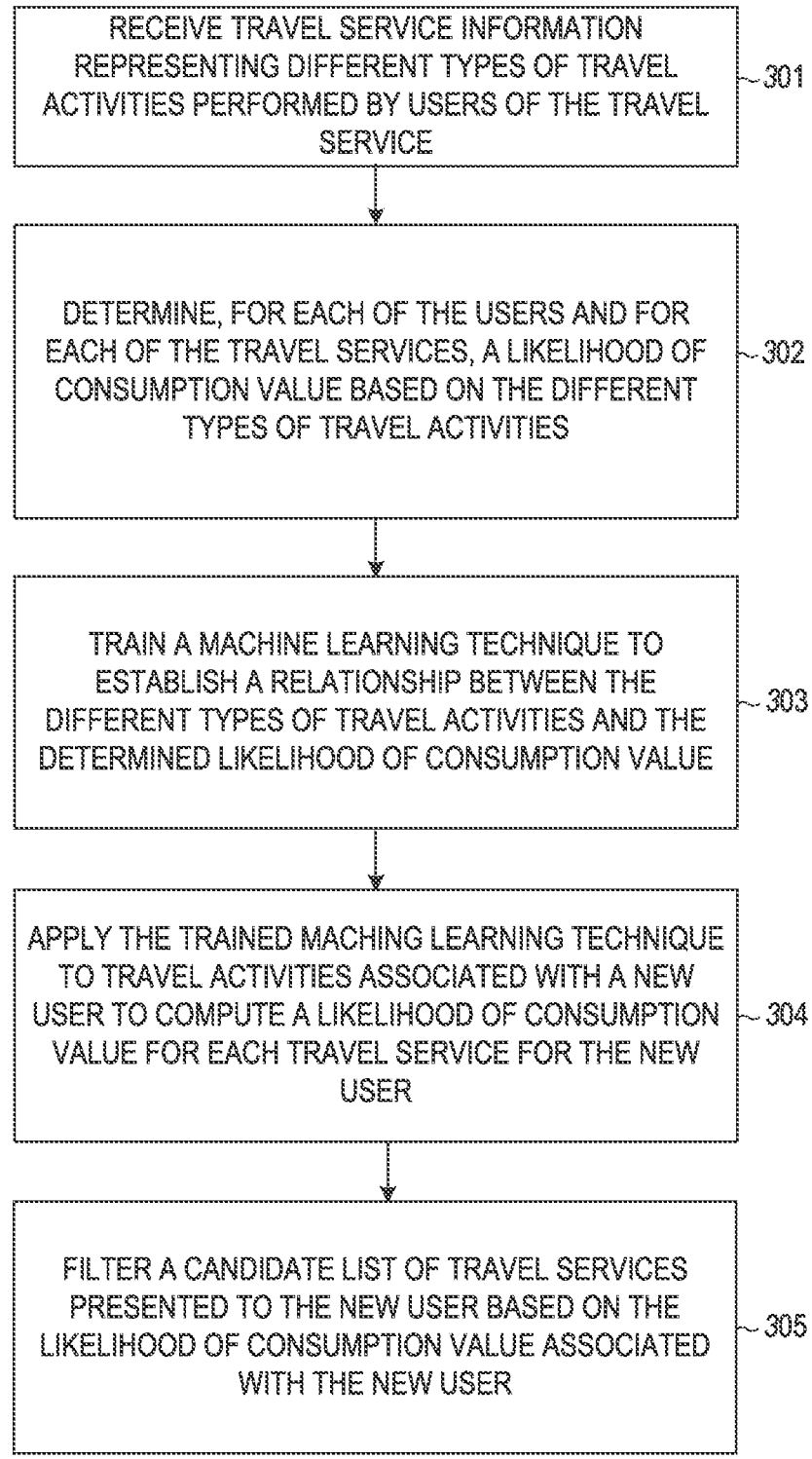
FIGS. 3-4 illustrate flow diagrams of processes of the travel services system, according to some example embodiments.
Figure 4:
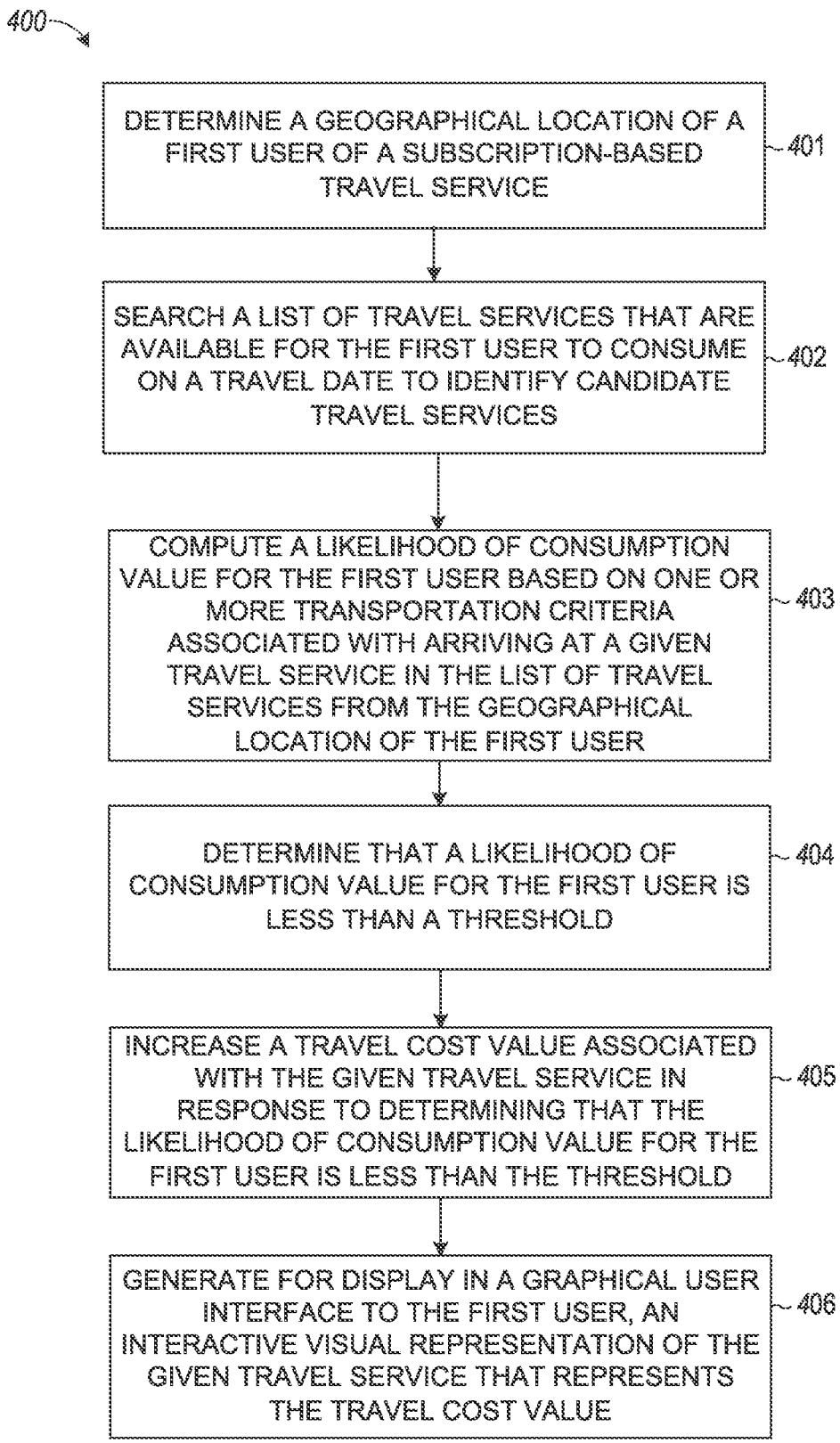

FIGS. 3-4 illustrate flow diagrams of processes of the travel services system 124, according to some example embodiments. The processes 300, 400 may be embodied in computer-readable instructions for execution by one or more processors such that the operations of the processes 300, 400 may be performed in part or in whole by the functional components of the server system 108; accordingly, the processes 300, 400 are described below by way of example with reference thereto. However, in other embodiments at least some of the operations of the processes 300, 400 may be deployed on various other hardware configurations. The processes 300, 400 are therefore not intended to be limited to the server system 108 and can be implemented in whole, or in part, by any other component. Any operation in the processes 300, 400 can be performed in any order or entirely omitted and skipped.

At operation 301, a computing system (e.g., server system 108) receives travel service information representing different types of travel activities performed by users of the travel service. For example, travel services training data module 210 obtains, from database 128 and/or server 130, travel services activities of various types associated with users of the travel services system 124 (e.g., number of reservations made, subscription duration, distance to travel destinations, margin amount, reservation frequency, transportation criteria, cancelation frequency, etc.).

At operation 302, the computing system determines, for each of the users and for each of the travel services (or range of travel destination locations), a likelihood of consumption value, based on the different types of travel activities.

At operation 303, the computing system trains a machine learning technique to establish a relationship between the different types of travel activities and the determined likelihood of consumption value. For example, travel services training data module 210 provides the known travel activities of the users and the transportation criteria experienced by each of the users in reaching destinations booked by the users to machine learning technique training module 220. Machine learning technique training module 220 inputs the received data into a linear model (e.g., a log odds model) to estimate or compute coefficients associated with each activity. In some implementations, machine learning technique training module 220 performs a regression technique to estimate the coefficients of the model.

At operation 304, the computing system applies the trained machine learning technique to travel activities associated with a new user to compute a likelihood of consumption value for each travel service for the new user based on the types of transportation criteria the new user is estimated to be willing to experience. For example, new travel service request module 240 obtains a travel request from a user, via a graphical user interface on a client device 110, and obtains from database 128 travel activities previously performed by the user. The trained machine learning technique module 230 is applied to the information provided by the new travel service request module 240 to estimate a likelihood of consumption value for each travel service for the new user and/or new travel request.

At operation 305, the computing system filters a candidate list of travel services presented to the new user based on the likelihood of consumption value of each travel service for the new user. For example, the travel services search module 260 receives the user classification and filters identified travel services that match a travel search request based on the likelihood of consumption. In some cases, travel services with a low likelihood of consumption value are not filtered and are ranked higher in a list that is provided to a user than other travel services with a high likelihood of consumption value.

At operation 401, the computing system determines a geographical location of a first user of a subscription-based travel service.

At operation 402, the computing system searches a list of travel services that are available for the first user to consume on a travel date to identify candidate travel services.

At operation 403, the computing system computes a likelihood of consumption value for the first user based on one or more transportation criteria associated with arriving at a given travel service in the list of travel services from the geographical location of the first user. For example, the computing system determines that the first user is willing to experience a first set of transportation criteria in reaching a given travel service which is less difficult or has a lower level of agony than a specified amount. The computing system may compare the first set of transportation criteria to the one or more transportation criteria associated with arriving at the given travel service. The difference or deviation that results from the comparison reflects the likelihood of consumption value. For example, the first set of transportation criteria may include 1 stop over on a flight and the one or more transportation criteria associated with arriving at the given travel service may specify 3 stop overs on a flight. In such cases, the difference is 2 stops. As another example, the first set of transportation criteria may include 2 hours travel time from the user's location to a given travel service and the one or more transportation criteria associated with arriving at the given travel service may specify 4 hours travel time from the user's location to the location of the given travel service. In such cases, the difference is 2 hours.

At operation 404, the computing system determines that a likelihood of consumption value for the first user is less than a threshold. For example, the threshold may be set to 1 stop and the difference of 2 stops does not exceed this threshold. As another example, if the one or more transportation criteria associated with arriving at the given travel service includes 0 stops, the difference between 1 stop and 0 stops may be −1, which is greater than the threshold of 2 stops. As another example, the threshold may be set to 5 hours and the difference of 2 hours does not exceed this threshold.

At operation 405, the computing system increases a travel cost value associated with the given travel service in response to determining that the likelihood of consumption value for the first user is less than the threshold. For example, the computing system may apply a higher maximum purchase amount to determine whether to filter the given travel service based on a cost of the travel service. Namely, rather than applying a first maximum purchase amount which is exceeded by the cost of the travel service, the computing system applies a higher second maximum purchase amount which is not exceeded by the cost of the travel service. As a result, the given travel service is not filtered from the list of travel services presented to the user.

At operation 406, the computing system generates, for display in a graphical user interface to the first user, an interactive visual representation of the given travel service that represents the travel cost value. For example, the travel services search module 260 provides the list of search results that satisfy the travel criteria and the guard range (and optionally are filtered based on the likelihood of consumption value for each travel service provided by the trained machine learning technique module 230) to the new travel service request module 240. The new travel service request module 240 presents the search results back to the user at the client device 110 in a graphical user interface.

Figure 5B:
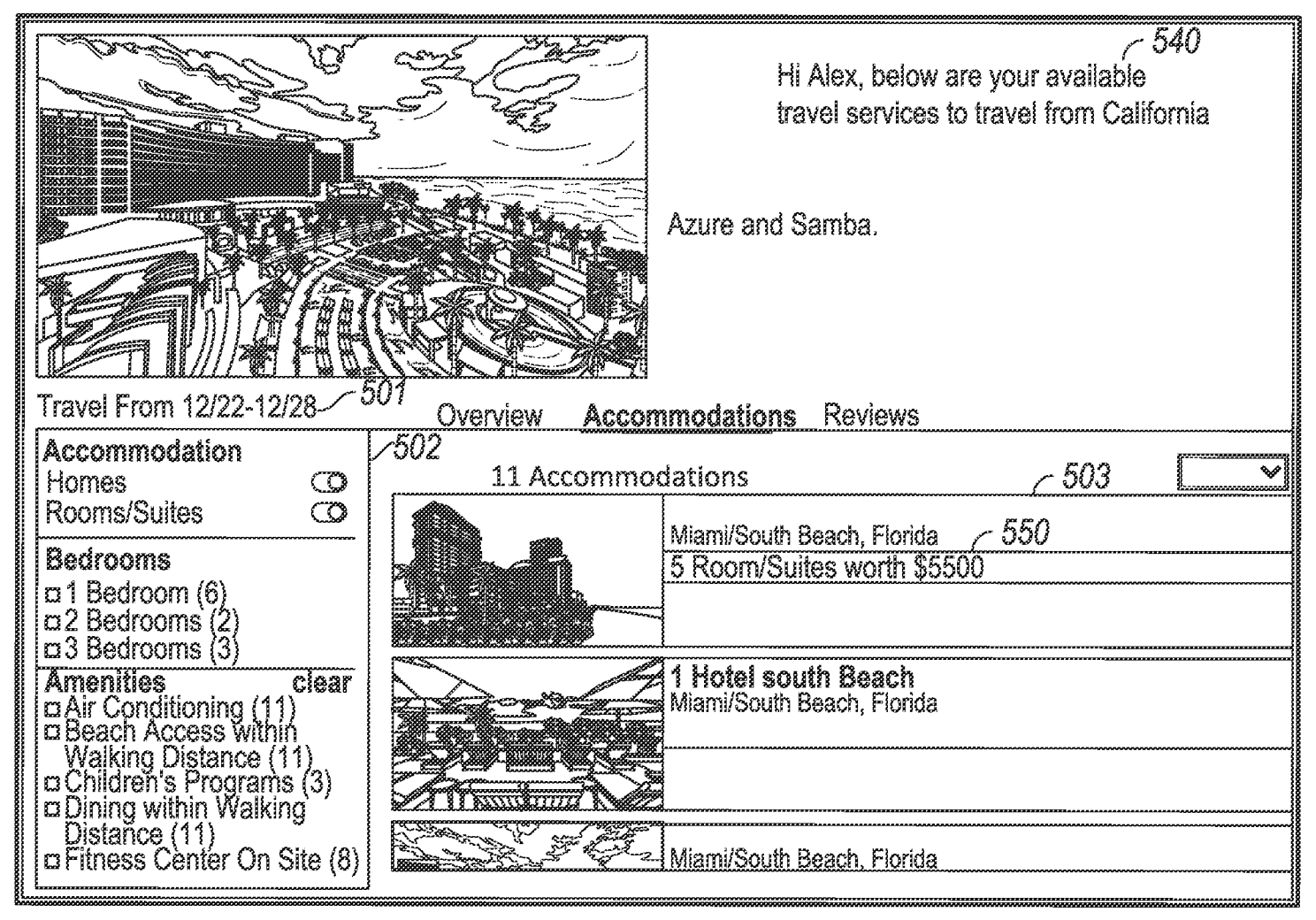

FIGS. 5A and 5B are illustrative graphical user interfaces of the travel services system 124, according to some example embodiments. As shown in FIG. 5A, a first user (Julie) can input travel search criteria 501. This travel criteria may include various parameters 502 including a travel destination, distance to the destination, start date of the travel, end date of the travel, number of days in the trip, quality of the travel services, and/or any combination thereof. The travel services system 124 processes the travel search criteria and automatically generates a list of matching travel services for presentation using one or more interactive visual representations 503. In some cases, the travel services system 124 processes the travel search criteria and automatically selects one of a plurality of previously generated and curated lists of travel services for presentation using one or more interactive visual representations 503. A user can select any one of the interactive visual representations 503 to instruct the travel services system 124 to complete a reservation for the corresponding travel service associated with the selected visual representation.

In some embodiments, the travel services in the graphical user interface of FIG. 5 are generated using individualized travel service lists for the user based on travel behaviors, geographical location, transportation criteria, demographics, or a margin target for the user. For example, the travel services system 124 may further filter or reorganize the list of available travel services presented to the first user in FIG. 5A based on a profile of the first user that indicates various attributes of the user (e.g., travel behaviors, geographical location, demographics, cancelation frequency, number of reservations made in a given time interval, or a margin target specific to the user or classification of the user).

The graphical user interface of FIG. 5A may include an option enabling the user to sort or filter the travel services presented in the graphical user interface based on a predicted likelihood that the user will reserve the travel services using a preference technique or a recommendation technique based on transportation criteria associated with each travel service. In such cases, those travel services that have a greater likelihood may then be presented at the bottom of the list (or omitted entirely) as the user is more likely to be interested to reserve those travel services and those with higher likelihood are presented at the top of the list.

As an example, after receiving the search criteria from the first user (Julie), the travel services system 124 may obtain a list of travel services that are available and that match the search criteria. The travel services system 124 generates one or more subscription values for the first user (Julie) that are each associated with different sets of transportation criteria. A first of the subscription values may be associated with a first set of transportation criteria and a second of the subscription values may be associated with a second set of transportation criteria. The second of the subscription values may be greater than the first of the subscription values. The travel services system 124 determines transportation criteria for each travel service in the list of travel services based on a geographical location of the first user. The travel services system 124 compares a cost of each travel service with a respective one of the subscription values that corresponds to the determined transportation criteria of the travel service. Based on this comparison, the travel services system 124 generates a filtered or curated list of travel services and presents the list to the user in FIG. 5A. Specifically, the travel services system 124 provides a message 510 indicating to the first user (Julie) that the list of travel services the user can book are shown.

As an example, the travel services system 124 may determine that, based on the first user's location, a given hotel is likely to be consumed by the first user because the user is in Georgia and the given travel service is nearby in Miami, Florida. For this hotel, the travel services system 124 may determine that the first set of transportation criteria applies for the first user and so uses a first subscription value to determine whether or not to include the hotel in the list. In this case, the hotel 520 with 3 rooms and valued at $3500 is determined to be less than the first subscription value and is presented to the first user. The same hotel may have 5 rooms available for $5500 but this amount exceeds the first subscription value and so is not presented as an available travel service to the first user.

In some implementations, as shown in FIG. 5B, a second user (Alex) may provide the same travel search criteria as the first user and at substantially the same time or date. The second user (Alex) may be in a different geographical location (e.g., California). As such, the travel services system 124 may determine that, based on the second user's location, the same hotel is unlikely to be consumed by the second user because the second user is in California, which is far away from the given travel service in Miami, Florida. For this hotel, the travel services system 124 may determine that the second set of transportation criteria for the second user applies and so uses a second subscription value to determine whether or not to include the hotel in the list. In this case, because the second subscription value is greater than the first subscription value, the same hotel 550 with 5 rooms available for $5500 (which was excluded from the list presented to the first user in FIG. 5A) may be determined to be less than the second maximum purchase amount. Accordingly, the travel services system 124 provides a message 540 indicating to the second user (Alex) that the list of travel services the user can book are shown and includes the hotel 550 with 5 rooms available. This is an example of how the second user is provided with more travel cost value for the travel service (hotel 550) than the first user for the hotel in response to determining that the second user is unlikely to consume or book the hotel (e.g., has a likelihood of consumption value for the hotel that is less than a threshold).

In some embodiments, the list presented to the first and second users in FIGS. 5A and 5B may be sorted or organized based on the transportation criteria associated with each travel service. Specifically, the list may be sorted such that travel services associated with a second set of transportation criteria (or those unlikely to be consumed by the users), which may represent a greater difficulty in arriving at the travel service, are presented higher or are ranked higher in the list than other travel services associated with a first set of transportation criteria (or those likely to be consumed by the users), which may represent a lower difficulty in arriving at the travel service. For example, travel services that are likely to be consumed may be excluded from the lists presented to the users or may be positioned lower in the presented lists than other travel services. As an example, the hotel 550 may be presented to the second user (Alex) at the top of the list but may be excluded from presentation (or be presented at the bottom of the list) to the first user (Julie). This is because the first user is associated with a first set of transportation criteria for reaching the hotel 550, which represents lower difficulty than a second set of transportation criteria for the second user to reach the same hotel 550.

Figure 6:
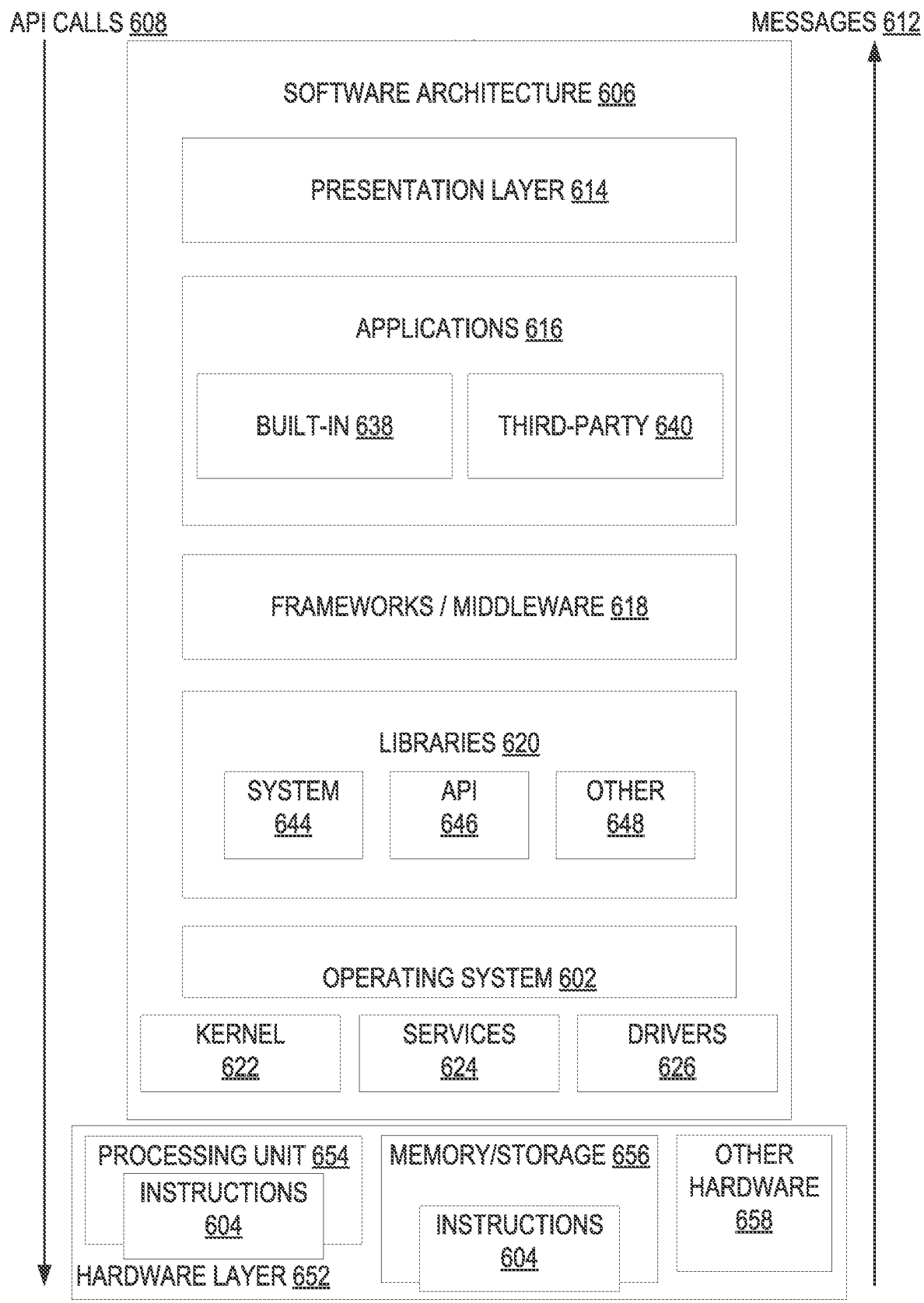
FIG. 6 is a block diagram illustrating an example of a software architecture that may be installed on a machine, according to some example embodiments.

FIG. 6 is a block diagram illustrating software architecture 606, which can be installed on any one or more of the devices described above. For example, in various embodiments, client devices 110 and servers and systems 130, 108, 120, 122, and 124 may be implemented using some or all of the elements of software architecture 606. FIG. 6 is merely a non-limiting example of a software architecture, and it will be appreciated that many other architectures can be implemented to facilitate the functionality described herein. In various embodiments, the software architecture 606 is implemented by hardware (including a hardware layer 652 with processing unit 654, memory/storage 656, and other hardware 658) such as machine 800 of FIG. 7 that includes processors 804, memory/storage 806, and input/output (I/O) components 818. As explained below, the processing unit 654 is configured to execute instructions 604 that are stored in memory/storage 656. In this example, the software architecture 606 can be conceptualized as a stack of layers where each layer may provide a particular functionality. For example, the software architecture 606 includes layers such as an operating system 602, presentation layer 614, libraries 620, frameworks 618, and applications 616. Operationally, the applications 616 invoke API calls 608 through the software stack and receive messages 612 in response to the API calls 608, consistent with some embodiments.

In various implementations, the operating system 602 manages hardware resources and provides common services. The operating system 602 includes, for example, a kernel 622, services 624, and drivers 626. The kernel 622 acts as an abstraction layer between the hardware and the other software layers, consistent with some embodiments. For example, the kernel 622 provides memory management, processor management (e.g., scheduling), component management, networking, and security settings, among other functionality. The services 624 can provide other common services for the other software layers. The drivers 626 are responsible for controlling or interfacing with the underlying hardware, according to some embodiments. For instance, the drivers 626 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 620 provide a low-level common infrastructure utilized by the applications 616. The libraries 620 can include system libraries 644 (e.g., C standard library) that can provide functions such as memory allocation functions, string manipulation functions, mathematic functions, and the like. In addition, the libraries 620 can include API libraries 646 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and in three dimensions (3D) graphic content on a display), database libraries (e.g., SQLite to provide various relational database functions), web libraries (e.g., WebKit to provide web browsing functionality), and the like. The libraries 620 can also include a wide variety of other libraries 648 to provide many other APIs to the applications 616.

The frameworks 618 provide a high-level common infrastructure that can be utilized by the applications 616, according to some embodiments. For example, the frameworks 618 provide various graphic user interface functions, high-level resource management, high-level location services, and so forth. The frameworks 618 can provide a broad spectrum of other APIs that can be utilized by the applications 616, some of which may be specific to a particular operating system 602 or platform.

In an example embodiment, the applications 616 include built-in applications 638 including any one or more of a home application, a contacts application, a browser application, a book reader application, a location application, a media application, a messaging application, a game application, and a broad assortment of other applications such as a third-party application 640. According to some embodiments, the applications 616 are programs that execute functions defined in the programs. Various programming languages can be employed to create one or more of the applications 616, structured in a variety of manners, such as object-oriented programming languages (e.g., Objective-C, Java, or C++) or procedural programming languages (e.g., C or assembly language). In a specific example, the third-party application 640 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 640 can invoke the API calls 608 provided by the operating system 602 to facilitate functionality described herein.

Some embodiments may particularly include a subscription based travel services application. In certain embodiments, this may be a stand-alone application that operates to manage communications with a server system such as third-party servers 130 or server system 108. In other embodiments, this functionality may be integrated with another application. The subscription based travel services application may request and display various data related to subscription based travel services and may provide the capability for a user to input data related to the objects via a touch interface, keyboard, or using a camera device of machine 800, communication with a server system, and receipt and storage of object data in a memory/storage device. Presentation of information and user inputs associated with the information may be managed by subscription based travel services application using different frameworks 618, library 620 elements, or operating system 602 elements operating on a machine 800.

Figure 7:
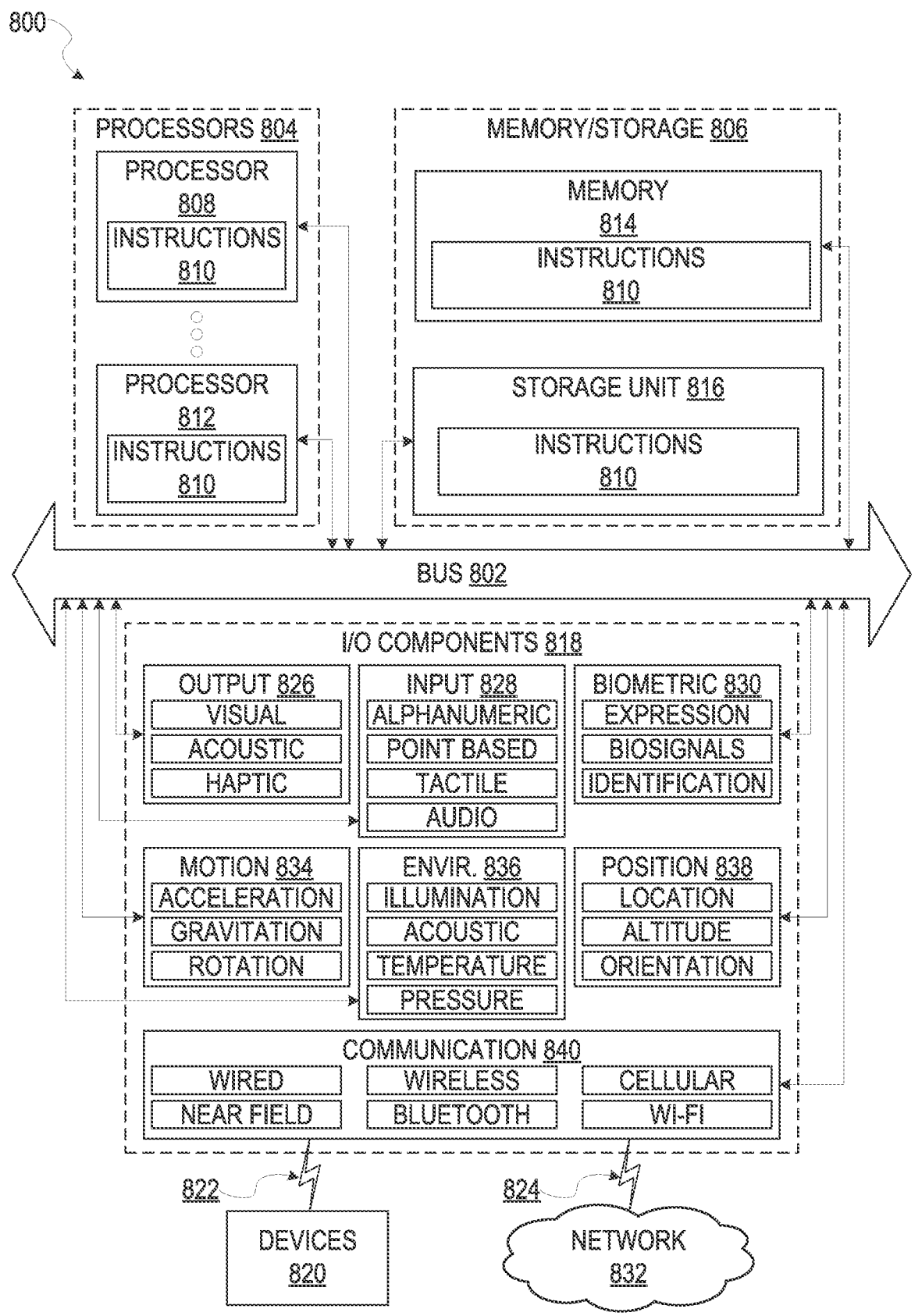
FIG. 7 illustrates a diagrammatic representation of a machine, in the form of a computer system, within which a set of instructions may be executed for causing the machine to perform any one or more of the methodologies discussed herein, according to an example embodiment.

FIG. 7 is a block diagram illustrating components of a machine 800, according to some embodiments, able to read instructions from a machine-readable medium (e.g., a machine-readable storage medium) and perform any one or more of the methodologies discussed herein. Specifically, FIG. 7 shows a diagrammatic representation of the machine 800 in the example form of a computer system, within which instructions 810 (e.g., software, a program, an application 616, an applet, an app, or other executable code) for causing the machine 800 to perform any one or more of the methodologies discussed herein can be executed. In alternative embodiments, the machine 800 operates as a standalone device or can be coupled (e.g., networked) to other machines. In a networked deployment, the machine 800 may operate in the capacity of a server machine 130, 108, 120, 122, 124, and the like, or as a client device 110 in a server-client network environment, or as a peer machine in a peer-to-peer (or distributed) network environment. The machine 800 can comprise, but not be limited to, a server computer, a client computer, a personal computer (PC), a tablet computer, a laptop computer, a netbook, a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 810, sequentially or otherwise, that specify actions to be taken by the machine 800. Further, while only a single machine 800 is illustrated, the term "machine" shall also be taken to include a collection of machines 800 that individually or jointly execute the instructions 810 to perform any one or more of the methodologies discussed herein.

In various embodiments, the machine 800 comprises processors 804, memory 814, and I/O components 818, which can be configured to communicate with each other via a bus 802. In an example embodiment, the processors 804 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 808 and a processor 812 that may execute the instructions 810. The term "processor" is intended to include multi-core processors 804 that may comprise two or more independent processors 804 (also referred to as "cores") that can execute instructions 810 contemporaneously. Although FIG. 7 shows multiple processors 804, the machine 800 may include a single processor 804 with a single core, a single processor 804 with multiple cores (e.g., a multi-core processor 804), multiple processors 804 with a single core, multiple processors 804 with multiples cores, or any combination thereof.

The memory/storage 806 comprises a main memory 814, a static memory, and a storage unit 816 accessible to the processors 804 via the bus 802, according to some embodiments. The storage unit 816 can include a machine-readable medium on which are stored the instructions 810 embodying any one or more of the methodologies or functions described herein. The instructions 810 can also reside, completely or at least partially, within the main memory 814, within the static memory, within at least one of the processors 804 (e.g., within the processor's cache memory), or any suitable combination thereof, during execution thereof by the machine 800. Accordingly, in various embodiments, the main memory 814, the static memory, and the processors 804 are considered machine-readable media.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium is shown, in an example embodiment, to be a single medium, the term "machine-readable medium" should be taken to include a single medium or multiple media (e.g., a centralized or distributed database, or associated caches and servers) able to store the instructions 810. The term "machine-readable medium" shall also be taken to include any medium, or combination of multiple media, that is capable of storing instructions (e.g., instructions 810) for execution by a machine (e.g., machine 800), such that the instructions 800, when executed by one or more processors of the machine 800 (e.g., processors 804), cause the machine 800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 818 include a wide variety of components to receive input, provide output, produce output, transmit information, exchange information, capture measurements, and so on. In general, it will be appreciated that the I/O components 818 can include many other components that are not shown in FIG. 7. The I/O components 818 are grouped according to functionality merely for simplifying the following discussion, and the grouping is in no way limiting. In various example embodiments, the I/O components 818 include output components 826 and input components 828. The output components 826 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 828 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 818 include biometric components 830, motion components 834, environmental components 836, or position components 838, among a wide array of other components. For example, the biometric components 830 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 834 include acceleration sensor components (e.g., accelerometer), gravitation sensor components, rotation sensor components (e.g., gyroscope), and so forth. The environmental components 836 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 838 include location sensor components (e.g., a GPS receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 818 may include communication components 840 operable to couple the machine 800 to a network 832 or devices 820 via a coupling 824 and a coupling 822, respectively. For example, the communication components 840 include a network interface component or another suitable device to interface with the network 832. In further examples, communication components 840 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 820 may be another machine 800 or any of a wide variety of peripheral devices (e.g., a peripheral device coupled via a USB).

Moreover, in some embodiments, the communication components 840 detect identifiers or include components operable to detect identifiers. For example, the communication components 840 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 840, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 832 can be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a WI-FI® network, another type of network, or a combination of two or more such networks. For example, the network 832 or a portion of the network 832 may include a wireless or cellular network, and the coupling 824 may be a Code Division Multiple Access (CDMA) connection, a Global System for Mobile communications (GSM) connection, or another type of cellular or wireless coupling. In this example, the coupling 822 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 810 are transmitted or received over the network 832 using a transmission medium via a network interface device (e.g., a network interface component included in the communication components 840) and utilizing any one of a number of well-known transfer protocols (e.g., Hypertext Transfer Protocol (HTTP)). Similarly, in other example embodiments, the instructions 810 are transmitted or received using a transmission medium via the coupling 822 (e.g., a peer-to-peer coupling) to the devices 820. The term "transmission medium" shall be taken to include any intangible medium that is capable of storing, encoding, or carrying the instructions 810 for execution by the machine 800, and includes digital or analog communications signals or other intangible media to facilitate communication of such software.

Furthermore, the machine-readable medium is non-transitory (in other words, not having any transitory signals) in that it does not embody a propagating signal. However, labeling the machine-readable medium "non-transitory" should not be construed to mean that the medium is incapable of movement; the medium should be considered as being transportable from one physical location to another. Additionally, since the machine-readable medium is tangible, the medium may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
    computing, by one or more processors, a subscription value for a first user as a function of a future experience date and a current date, the subscription value comprising an amortized value portion, the subscription value representing a total amount of resources that will be available to be used for accessing an experience on the future experience date;
    searching, by the one or more processors, a plurality of experience related resources that are available for the first user to consume on the future experience date to identify candidate experience related resources;
    training a machine learning technique by processing training data comprising data associated with one or more users that include at least a given user, the training being performed by:
        retrieving a portion of the training data from a storage device;
        extracting features from the training data for the one or more users that include at least the given user;
        utilizing the machine learning technique to estimate a first likelihood of consumption value for the given user based on the features and based on one or more transportation criteria associated with consumption of a given experience related resource; and
        updating parameters of the machine learning technique based on the first likelihood of consumption value for the given user;
    applying the machine learning technique, as trained, to activity information for the first user to estimate a second likelihood of consumption value for the first user;
    determining, by the one or more processors, that the second likelihood of consumption value for the first user transgresses a threshold;
    determining first and second maximum purchase amounts based on first and second subscription values, the first subscription value corresponding to a first set of transportation criteria and the second subscription value corresponding to a second set of transportation criteria; and
    generating, by the one or more processors, for display in a graphical user interface to the first user, an interactive visual representation of the given experience related resource based on the subscription value and based on determining that the second likelihood of consumption value for the first user transgresses the threshold.

2. The computer-implemented method of claim 1, further comprising:
    increasing, by the one or more processors, an experience cost value associated with the given experience related resource in response to determining that the second likelihood of consumption value for the first user transgresses the threshold, the experience cost value being based on at least one of the first or second maximum purchase amounts, the given experience related resource being associated with a cost that is greater than the first maximum purchase amount and less than the second maximum purchase amount.

3. The computer-implemented method of claim 1, wherein the first and second subscription values each comprises an accumulated value portion and the amortized value portion.

4. The computer-implemented method of claim 3, further comprising computing the accumulated value portion of the first and second subscription values by:
    determining a time interval between a current date and the future experience date corresponding to the given experience related resource; and
    accumulating the subscription value over the time interval.

5. The computer-implemented method of claim 4, wherein the time interval is monthly, further comprising determining a number of months between the current date and the future experience date; and wherein the first and second subscription values are computed as a function of a monthly subscription cost to the first user and the number of months.

6. The computer-implemented method of claim 1, further comprising computing the amortized value portion by:
    determining an annual cost of a subscription of the first user;
    dividing the annual cost by a specified repeated time interval in a year;
    determining a number of times the specified repeated time interval repeats between a current date and the future experience date; and
    computing the amortized value portion as a function of the annual cost, as divided and the number of times.

7. The computer-implemented method of claim 1, wherein the one or more transportation criteria represents a level of difficulty experienced by the first user in consuming the given experience related resource from a geographical location of the first user and includes at least one of expense, number of stops, duration of travel, mode of transportation, or level of agony.

8. The computer-implemented method of claim 1, further comprising:
    receiving a user selection of the interactive visual representation via the graphical user interface;
    reserving the given experience related resource for the first user in response to receiving the user selection; and
    preventing the first user from reserving additional experience related resources until the given experience related resource expires or is consumed by the first user.

9. The computer-implemented method of claim 1, wherein the given experience related resource is a hotel.

10. The computer-implemented method of claim 9, wherein an experience cost value of the given experience related resource is a first experience cost value, further comprising:
    applying the machine learning technique, as trained, to estimate a third likelihood of consumption value for a second user based on a future experience date and one or more transportation criteria associated with consuming the given experience related resource by the second user; and
    determining that the third likelihood of consumption value for the second user transgresses the threshold.

11. The computer-implemented method of claim 10, further comprising in response to determining that the third likelihood of consumption value for the second user transgresses the threshold, generating for display in a graphical user interface to the second user, an interactive visual representation of a ranked list of experience related resources that deprioritizes the given experience related resource.

12. The computer-implemented method of claim 1, wherein the second likelihood of consumption value for the first user is computed based on a distance between a location associated with the given experience related resource and a geographical location of the first user.

13. A system comprising:
a memory that stores instructions; and
one or more processors on a server configured by the instructions to perform operations comprising:
computing a subscription value for a first user as a function of a future experience date and a current date, the subscription value comprising an amortized value portion, the subscription value representing a total amount of resources that will be available to be used for accessing an experience on the future experience date;
searching a plurality of experience related resources that are available for the first user to consume on the future experience date to identify candidate experience related resources;
training a machine learning technique by processing training data comprising data associated with one or more users that include at least a given user, the training being performed by:
retrieving a portion of the training data from a storage device;
extracting features from the training data for the one or more users that include at least the given user;
utilizing the machine learning technique to estimate a first likelihood of consumption value for the given user based on the features and based on one or more transportation criteria associated with consumption of a given experience related resource; and
updating parameters of the machine learning technique based on the first likelihood of consumption value for the given user;
applying the machine learning technique, as trained, to activity information for the first user to estimate a second likelihood of consumption value for the first user;
determining that the second likelihood of consumption value for the first user transgresses a threshold;
determining first and second maximum purchase amounts based on first and second subscription values, the first subscription value corresponding to a first set of transportation criteria and the second subscription value corresponding to a second set of transportation criteria; and
generating for display in a graphical user interface to the first user, an interactive visual representation of the given experience related resource based on the subscription value and based on determining that the second likelihood of consumption value for the first user transgresses the threshold.

14. The system of claim 13, wherein the operations further comprise:
increasing, by the one or more processors, an experience cost value associated with the given experience related resource in response to determining that the second likelihood of consumption value for the first user transgresses the threshold, the experience cost value being based on at least one of the first or second maximum purchase amounts, the given experience related resource being associated with a cost that is greater than the first maximum purchase amount and less than the second maximum purchase amount.

15. The system of claim 13, wherein the first and second subscription values each comprises an accumulated value portion and the amortized value portion.

16. The system of claim 15, wherein the operations further comprise computing the accumulated value portion of the first and second subscription values by:
determining a time interval between a current date and the future experience date corresponding to the given experience related resource; and
accumulating the subscription value over the time interval.

17. The system of claim 16, wherein the time interval is monthly, further comprising determining a number of months between the current date and the future experience date; and wherein the first and second subscription values are computed as a function of a monthly subscription cost to the first user and the number of months.

18. A non-transitory computer-readable medium comprising instructions stored thereon that are executable by at least one processor to cause a computing device to perform operations comprising:
computing a subscription value for a first user as a function of a future experience date and a current date, the subscription value comprising an amortized value portion, the subscription value representing a total amount of resources that will be available to be used for accessing an experience on the future experience date;
searching a plurality of experience related resources that are available for the first user to consume on the future experience date to identify candidate experience related resources;
training a machine learning technique by processing training data comprising data associated with one or more users that include at least a given user, the training being performed by:
retrieving a portion of the training data from a storage device;
extracting features from the training data for the one or more users that include at least the given user;
utilizing the machine learning technique to estimate a first likelihood of consumption value for the given user based on the features and based on one or more transportation criteria associated with consumption of a given experience related resource; and
updating parameters of the machine learning technique based on the estimated first likelihood of consumption value for the given user;
applying the machine learning technique, as trained, to activity information for the first user to estimate a second likelihood of consumption value for the first user;
determining that the second likelihood of consumption value for the first user transgresses a threshold;
determining first and second maximum purchase amounts based on first and second subscription values, the first subscription value corresponding to a first set of transportation criteria and the second subscription value corresponding to a second set of transportation criteria; and
generating for display in a graphical user interface to the first user, an interactive visual representation of the given experience related resource based on the subscription value and based on determining that the second likelihood of consumption value for the first user transgresses the threshold.

19. The non-transitory computer-readable medium of claim 18, wherein the operations further comprise:
increasing, by the at least one processor, an experience cost value associated with the given experience related resource in response to determining that the second likelihood of consumption value for the first user transgresses the threshold, the experience cost value being based on at least one of the first or second maximum purchase amounts, the given experience related resource being associated with a cost that is greater than the first maximum purchase amount and less than the second maximum purchase amount.

20. The non-transitory computer-readable medium of claim 18, wherein the first and second subscription values each comprises an accumulated value portion and the amortized value portion.

\* \* \* \* \*